(12) United States Patent
Booth et al.

(10) Patent No.: US 10,808,336 B2
(45) Date of Patent: Oct. 20, 2020

(54) VEHICLE SEAT TRIM COVERS WITH KNITTED ATTACHMENT STRUCTURES FORMED WITH HEAT-ACTIVATED YARNS

(71) Applicant: GM Global Technology Operations LLC, Detroit, MI (US)

(72) Inventors: Daniel W. Booth, Troy, MI (US); Paul W. Alexander, Ypsilanti, MI (US); Nancy L. Johnson, Northville, MI (US); Heidi H. McAdoo-Wilson, Tecumseh (CA); Janet C. Robincheck, Sterling Heights, MI (US); Dorel M. Sala, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 65 days.

(21) Appl. No.: 15/994,345

(22) Filed: May 31, 2018

(65) Prior Publication Data
US 2019/0368078 A1    Dec. 5, 2019

(51) Int. Cl.
*B60N 2/58*    (2006.01)
*D02G 3/40*    (2006.01)

(52) U.S. Cl.
CPC ........... *D02G 3/402* (2013.01); *B60N 2/5825* (2013.01); *B60N 2/5891* (2013.01)

(58) Field of Classification Search
CPC ... B60N 2/5825; B60N 2/5891; B60N 2/7017
See application file for complete search history.

(56) References Cited

U.S. PATENT DOCUMENTS

| | | | |
|---|---|---|---|
| 4,558,905 A | 12/1985 | Natori | |
| 4,579,389 A | 4/1986 | Shimbori et al. | |
| 4,718,718 A | 1/1988 | Maruyama | |
| 4,865,383 A | 9/1989 | Sbaragli et al. | |
| 5,308,141 A | 5/1994 | Robinson et al. | |
| 5,326,150 A * | 7/1994 | Robinson | D04B 1/22 297/218.2 |
| 5,338,092 A | 8/1994 | Wiltsey et al. | |
| 5,466,003 A | 11/1995 | Tanaka et al. | |
| 5,678,853 A | 10/1997 | Maly | |
| 5,711,169 A * | 1/1998 | Leeke | B60N 2/5833 66/196 |
| 5,768,758 A | 6/1998 | Deignan et al. | |

(Continued)

FOREIGN PATENT DOCUMENTS

JP    2012218612 A    11/2012

OTHER PUBLICATIONS

Booth et al.; U.S. Appl. No. 16/178,006, filed Nov. 1, 2018 entitled "Knitted Seat Trim Cover With Integral Airbag Pocket"; 52 pages.

(Continued)

*Primary Examiner* — David R Dunn
*Assistant Examiner* — Tania Abraham

(57) ABSTRACT

A knitted seat trim cover for attachment to a vehicle seat includes a knitted trim panel configured to be installed over at least one foam support member of the vehicle seat and a fastener member integrally knitted in the knitted trim panel. The fastener member is configured to connect the knitted trim panel to the vehicle seat and at least a portion of the fastener member is made of a heat-activated yarn.

6 Claims, 15 Drawing Sheets

(56) References Cited

U.S. PATENT DOCUMENTS

| | | | |
|---|---|---|---|
| 5,890,381 A * | 4/1999 | Leeke | D04B 1/22 66/170 |
| 5,931,538 A | 8/1999 | Cayet et al. | |
| 6,397,638 B1 * | 6/2002 | Roell | D04B 1/16 66/61 |
| 6,401,496 B1 * | 6/2002 | Roell | D04B 1/22 66/170 |
| 6,499,801 B1 | 12/2002 | Peterson et al. | |
| 6,641,165 B2 | 11/2003 | Ohhashi | |
| 6,722,742 B2 | 4/2004 | Potes et al. | |
| 6,842,959 B2 | 1/2005 | Coffield et al. | |
| 6,899,399 B2 * | 5/2005 | Ali | B60N 2/5825 297/452.6 |
| 6,932,430 B2 | 8/2005 | Bedford et al. | |
| 6,955,402 B2 | 10/2005 | Vanderiet et al. | |
| 7,017,997 B2 | 3/2006 | Takezawa et al. | |
| 7,028,510 B1 | 4/2006 | DaRosa | |
| 7,096,549 B2 | 8/2006 | Coffield | |
| 7,132,144 B2 | 11/2006 | Roberts | |
| 7,141,768 B2 | 11/2006 | Malofsky et al. | |
| 7,159,293 B2 | 1/2007 | Coffield et al. | |
| 7,235,504 B2 | 6/2007 | Shirasaki et al. | |
| 7,422,281 B2 | 9/2008 | Miller | |
| 7,422,287 B2 | 9/2008 | Heidmann et al. | |
| 7,588,290 B2 | 9/2009 | Takezawa | |
| 7,607,730 B2 | 10/2009 | Moseneder | |
| 7,669,889 B1 | 3/2010 | Gorman et al. | |
| 7,669,925 B2 * | 3/2010 | Beck | B60N 2/5825 297/218.3 |
| 7,677,596 B2 | 3/2010 | Castro et al. | |
| 7,690,723 B2 | 4/2010 | Evans et al. | |
| 7,695,064 B2 | 4/2010 | Thomas et al. | |
| 7,784,819 B2 | 8/2010 | Lawall et al. | |
| 8,176,863 B2 | 5/2012 | Evans et al. | |
| 8,176,868 B2 | 5/2012 | Han | |
| 8,201,880 B2 | 6/2012 | Kato et al. | |
| 8,220,832 B2 | 7/2012 | Muller | |
| 8,398,174 B2 | 3/2013 | Hofmann | |
| 8,474,858 B2 | 7/2013 | Urabe et al. | |
| 8,485,551 B2 | 7/2013 | Dainese et al. | |
| 8,662,583 B2 * | 3/2014 | Guadagno | B60N 2/5833 297/218.1 |
| 8,690,256 B2 | 4/2014 | Hofmann et al. | |
| 8,814,267 B2 * | 8/2014 | Welch, Sr. | B60N 2/5825 297/218.4 |
| 8,820,780 B2 | 9/2014 | Thomas | |
| 8,845,020 B2 | 9/2014 | Sei et al. | |
| 8,919,878 B2 | 12/2014 | Sakamoto | |
| 8,974,004 B2 | 3/2015 | Sakamoto | |
| 8,991,934 B2 | 3/2015 | Sei et al. | |
| 8,998,339 B2 | 4/2015 | Peterson et al. | |
| 9,055,818 B2 | 6/2015 | Ludeke et al. | |
| 9,061,882 B2 | 6/2015 | Masuda et al. | |
| 9,380,840 B2 | 7/2016 | Okawa et al. | |
| 9,408,467 B2 | 8/2016 | Peterson et al. | |
| 9,462,891 B2 | 10/2016 | Kikuchi et al. | |
| 9,809,137 B2 * | 11/2017 | Kheil | B60N 2/5841 |
| 10,532,675 B2 | 1/2020 | Booth et al. | |
| 2002/0002854 A1 | 1/2002 | Imoto et al. | |
| 2002/0117882 A1 | 8/2002 | Takezawa | |
| 2005/0081353 A1 | 4/2005 | Law | |
| 2007/0066197 A1 | 3/2007 | Woo et al. | |
| 2007/0207691 A1 | 9/2007 | Cobbett Wiles et al. | |
| 2009/0033131 A1 * | 2/2009 | Clauser | B60N 2/5825 297/218.4 |
| 2010/0176633 A1 | 7/2010 | Brncick et al. | |
| 2011/0010900 A1 * | 1/2011 | Gilardi | B60N 2/5841 24/588.1 |
| 2012/0267937 A1 | 10/2012 | Sahashi | |
| 2012/0306256 A1 | 12/2012 | Okuyama et al. | |
| 2013/0057035 A1 | 3/2013 | Nishiura et al. | |
| 2016/0263857 A1 | 9/2016 | Mueller et al. | |
| 2016/0317047 A1 | 11/2016 | Sugiyama | |
| 2016/0375807 A1 | 12/2016 | Kageyama et al. | |
| 2017/0245602 A1 | 8/2017 | Nakaya et al. | |
| 2018/0105084 A1 | 4/2018 | Tobata et al. | |
| 2019/0023163 A1 | 1/2019 | Schrey | |
| 2019/0031063 A1 | 1/2019 | Suzuki et al. | |
| 2019/0368078 A1 | 12/2019 | Booth et al. | |
| 2020/0017006 A1 | 1/2020 | Booth et al. | |

OTHER PUBLICATIONS

Booth et al.; U.S. Appl. No. 15/994,277, filed May 31, 2018 entitled "Vehicle Seat Trim Cover With Integrally Knitted Attachment Features"; 46 pages.

Booth et al.; U.S. Appl. No. 16/033,678, filed Jul. 12, 2018 entitled "Vehicle Seat Trim Covers Including Integrally-Knit Backing Materials and Methods of Manufacturing Vehicle Seat Trim Covers"; 40 pages.

* cited by examiner

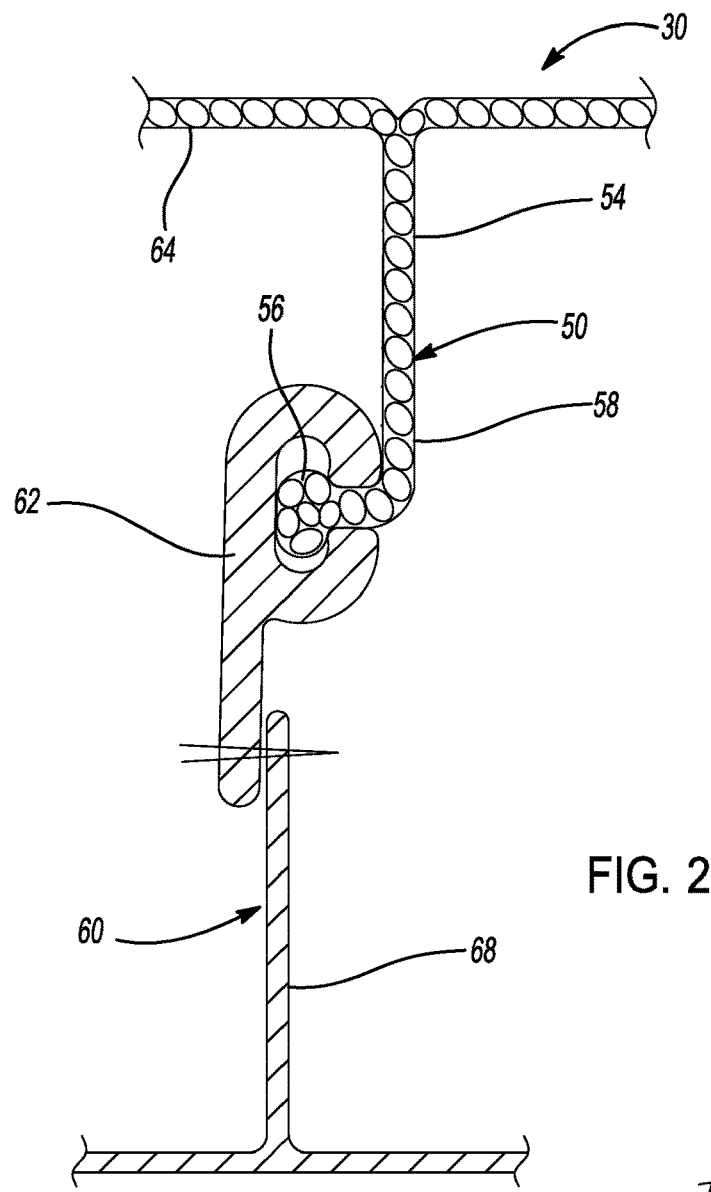
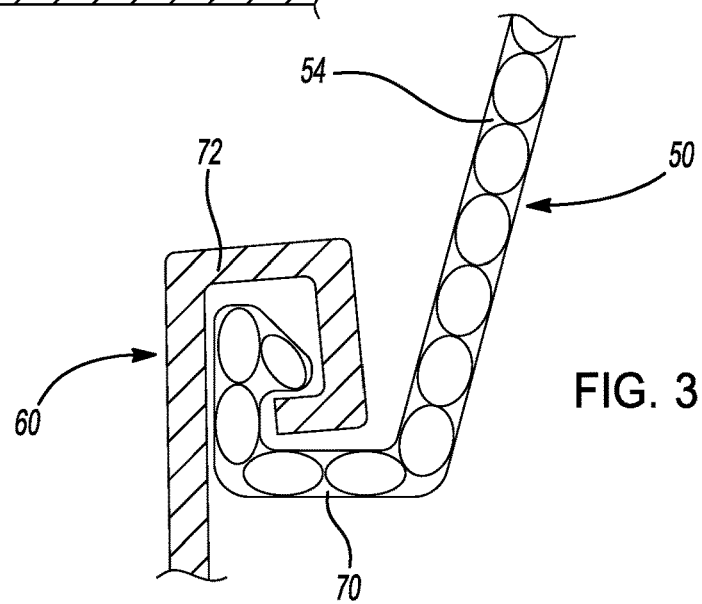
FIG. 2
FIG. 3

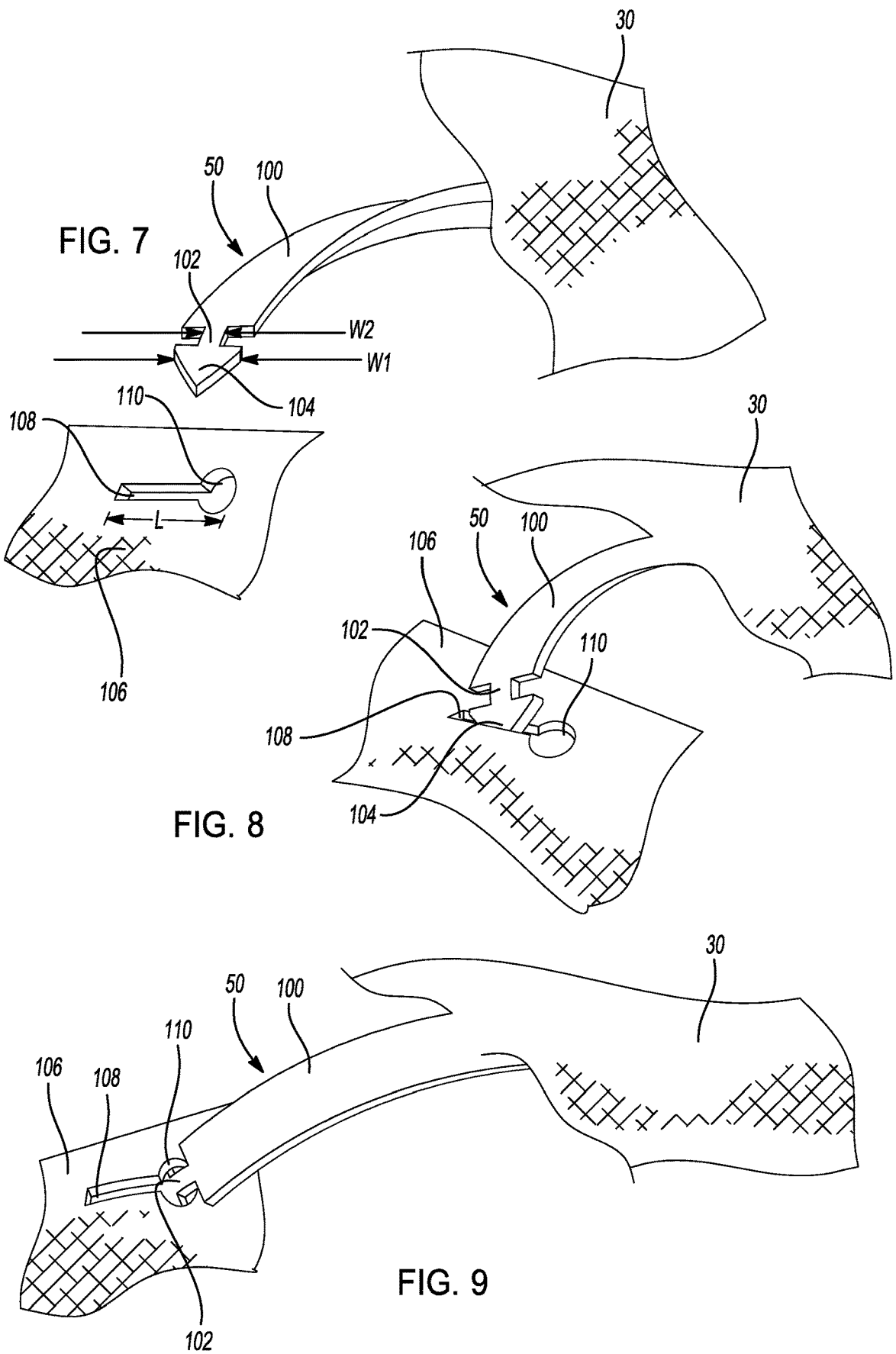

VEHICLE SEAT TRIM COVERS WITH KNITTED ATTACHMENT STRUCTURES FORMED WITH HEAT-ACTIVATED YARNS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle seat trim covers with knitted attachment structures formed with heat-activated yarns.

Seat trim covers for vehicle seats are often made of knitted fabrics. Such seat trim covers are installed over the internal structure and foam of the vehicle seat to result in an aesthetically pleasing and comfortable seating surface. The knitted seat trim covers are secured to the underlying internal structure and/or foam in order to prevent the seat trim cover from wrinkling, bridging, folding or exhibiting other undesirable surface imperfections.

Attachment structures are used to attach the seat trim covers to the internal structure or foam. Such attachment structures are connected to the seat trim covers and are secured to complimentary attachment features located on the underlying internal structure of the seat. The attachment structures located on the seat trim cover are secured to complimentary attachment structures on the underlying internal structure during assembly of the seat trim cover to maintain an aesthetically pleasing appearance.

SUMMARY

In one example in accordance with the present disclosure, a knitted seat trim cover for attachment to a vehicle seat includes a knitted trim panel configured to be installed over at least one foam support member of the vehicle seat and a fastener member integrally knitted in the knitted trim panel. The fastener member is configured to connect the knitted trim panel to the vehicle seat and at least a portion of the fastener member is made of a heat-activated yarn.

In one aspect, the heat-activated yarn is a bonding yarn configured to stiffen the fastener member after heat is applied to the fastener member.

In another aspect, the fastener member includes a male connector at a distal end thereof. The male connector has a rounded shape and is configured to releasably connect inside a female connector of a complimentary fastener member located on the vehicle seat.

In another aspect, a portion of the bonding yarn in the male connector melts when the heat is applied and hardens after the male connector cools.

In another aspect, the fastener member includes a hook portion at a distal end thereof. The hook portion is configured to releasably connect to a complimentary fastener member located on the vehicle seat.

In another aspect, the hook portion is integrally knitted with the bonding yarn and is configured to harden in a J-shape after heat is applied to the fastener member.

In another aspect, the fastener member is a male half of a snap connector that projects perpendicularly away from the knitted trim panel. The male half is integrally knitted with the bonding yarn and is configured to harden after heat is applied to the fastener member.

In another aspect, the fastener member is a female half of a snap connector that includes an opening in a center thereof. The female half is integrally knitted with the bonding yarn and is configured to receive a male half of a complimentary fastener member inside the opening.

In another aspect, the fastener member is an elongated tab of fabric including a head portion and a neck portion. The head portion has a first width and the neck portion has a second width. The first width is greater than the second width. The head portion prevents removal of the fastener member from a slot in a mating panel when the neck portion is positioned inside the slot.

In another aspect, the head portion and the neck portion are integrally knitted with the bonding yarn.

In another aspect, the fastener member includes a cylindrical base and at least one frusto-conical engagement portion. The at least one frusto-conical engagement portion is connected to the cylindrical base opposite to the knitted trim panel and is configured to engage an opening in a mating panel to retain the knitted trim panel to the vehicle seat.

In another aspect, the fastener member includes an expandable chamber configured to move from a relaxed state to an expanded state in response to a volume of pressurized air being introduced into the expandable chamber. The expandable chamber retains the fastener member in a mating panel when in the relaxed state and is removable from the mating panel when in the expanded state.

In another aspect, the expandable chamber is integrally knitted in the knitted trim panel.

In another aspect, the fastener member includes a narrowing chamber configured to move from a relaxed state to a narrowed state. The narrowing chamber retains the fastener member in a mating panel when in the relaxed state and is removable from the mating panel when in the narrowed state.

In another aspect, the heat-activated yarn includes a shape memory alloy (SMA) wire and the fastener member is configured change shape when heat is applied to the fastener member.

In another aspect, the fastener member includes a first side and a second side that define an aperture in the knitted trim panel. The shape memory alloy (SMA) wire in the heat-activated yarn moves the first side and the second side away from one another to increase a width of the aperture to permit a complimentary fastener member to be inserted through the aperture when heat is applied to the fastener member.

In another aspect, the fastener member defines an aperture in the knitted trim panel and the shape memory alloy (SMA) wire in the heat-activated yarn is knitted around the aperture to cause a diameter of the aperture to increase when heat is applied to the fastener member to permit a complimentary fastener member to be inserted through the aperture.

In another aspect, the fastener member includes a trunk portion and a cap portion. The cap portion includes an internal shaping member knitted with the shape memory alloy (SMA) wire and the internal shaping member is configured to pull sides of the cap portion toward one another to decrease a width of the cap portion when heat is applied to the fastener member to permit the fastener member to fit through a hole in a mating panel.

In another aspect, the fastener member is a knitted extension flap. The extension flap is configured to move from a curved shape to a planar shape when heat is applied to the fastener member.

In another aspect, the extension flap is configured to wrap around a support bar of the vehicle seat to retain the knitted trim panel to the vehicle seat.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a magnified sectional view of the example attachment structure of FIG. 1;

FIG. 3 is a magnified sectional view of another example attachment structure in accordance with the present disclosure;

FIG. 7 is an illustration of an example fastener member attached to a trim cover;

FIG. 8 is an illustration of the fastener member of FIG. 7 being inserted in a mating panel;

FIG. 9 is an illustration of the fastener member of FIG. 7 secured to the mating panel;

In the drawings, reference numbers may be reused to identify similar and/or identical elements.

DETAILED DESCRIPTION

Figure 1:
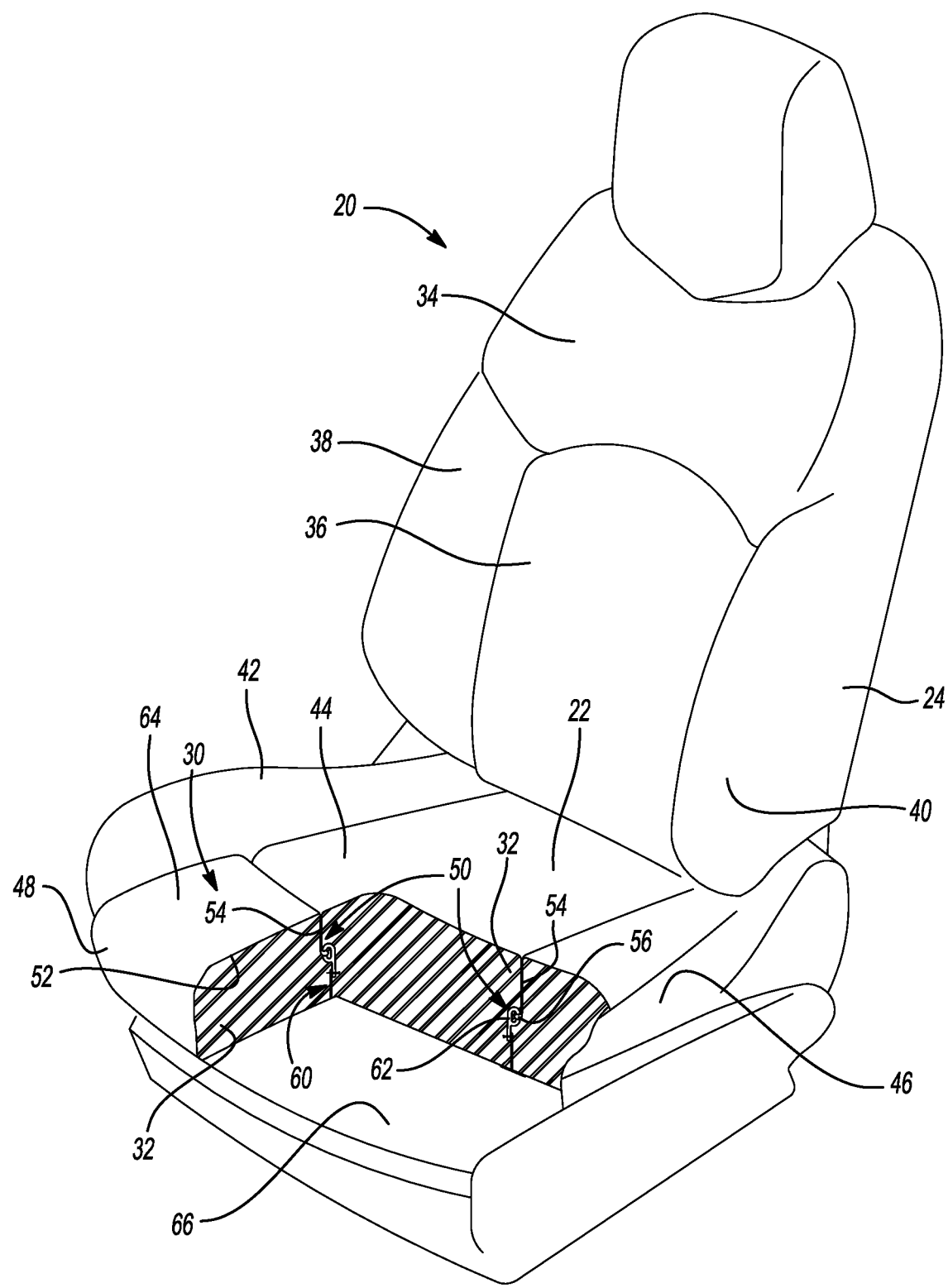
FIG. 1 is a perspective view of a vehicle seat including an example attachment structure in accordance with the present disclosure.

The seat trim covers of the present disclosure are constructed using a knitted fabric. The seat trim covers include attachment structures that are integrally knitted into the seat trim covers. The attachments structures are knit with a heat-activated yarn. The attachment structures that are constructed of the heat-activated yarns secure the seat trim cover over underlying foam support members to create a smooth, wrinkle-free seating surface that is comfortable and aesthetically pleasing.

In one example, a trim cover includes a fastener member that is integrally knitted in the trim cover. At least a portion of the fastener member is knit with a heat-activated yarn that is a bonding yarn. The bonding yarn melts when the yarn is heated above a predetermined temperature. When the bonding yarn cools, the bonding yarns hardens with surrounding fibers in the fastener member to stiffen the fastener member.

In one fastener member knitted with the heat-activated bonding yarn, the fastener member includes a rounded male connector. The rounded male connector is integrally knitted with the trim cover. The rounded male connector stiffens after the connector is heated above the predetermined temperature. The male connector is configured to releasably connect to a female connector in a complimentary fastener member connected to the vehicle seat. When the male connector is connected to the female connector the trim cover is secured to the vehicle seat.

In another example, the heat-activated yarn includes a shape memory alloy (SMA) wire. The shape memory alloy (SMA) wire is included with other fibers in the heat-activated yarn. The shape memory alloy (SMA) wire has a mechanical property that causes the shape memory alloy (SMA) wire to return an original shape after the wire is deformed. The shape memory allow (SMA) wire returns to its original shape when the wire is heated above a predetermined temperature.

An example fastener member of the present disclosure is integrally knit with the trim cover and includes a heat-activated yarn with a shape memory alloy (SMA) wire. The example fastener member operates in a relaxed state and in an excited state. In the relaxed state, the fastener member retains the trim cover to the vehicle seat. In the excited state, the fastener member changes shape in response to the shape memory alloy (SMA) wire moving to its original (pre-deformed) shape. In the excited state, the fastener member is removable from the vehicle seat.

In aforementioned examples, the trim covers that include the fastener members with the heat-activated yarns do not require fastener members to be attached using secondary processing steps such as stitching, adhesive bonding, staking, welding or the like. Instead, the fastener members are integrally knitted with the knitted trim covers. Thus, the trim covers of the present disclosure require less labor-intensive secondary processing than other trim covers.

The present disclosure describes use of heat-activated yarns in attachment structures and fastener members in a trim cover for a vehicle seat. The knitted structures of the present disclosure and the heat-activated yarns, however, can be used in other applications. The knitted structures can also be used, for example, in other interior trim components, in furniture, in clothing, in architectural applications, and in other consumer products.

Referring now to FIG. 1, a vehicle seat 20 includes a bottom portion 22 and a back portion 24. A trim cover 30 is secured to the seat 20 to cover one or more foam support members 32. The trim cover 30 is pulled tightly against the foam support members 32 to prevent the trim cover 30 from wrinkling, bulging or otherwise separating from the foam support members 32. In the example shown, the trim cover 30 includes a top section 34, a back middle section 36, a back inboard side section 38, a back outboard side section 40, a bottom middle section 42, a bottom inboard side section 44, a bottom outboard side section 46 and a front section 48. These various sections of the trim cover 30 are connected to one another and are secured to the vehicle seat 20 to cover the foam support members 32.

The trim cover 30 is knitted as a single panel of material. The various sections of the trim cover 30 such as the bottom middle section 42, the bottom inboard side section 44, the bottom outboard side section 46 and/or the front section 48 are joined to one another and may appear to have a seam. The adjacent sections, however, are formed to appear as such during a singular knitting process. In other examples, the various sections of the trim cover 30 are seamlessly connected. The trim cover 30, in the example shown, is knitted with the contours and shape of the underlying foam support members 32 so that the trim cover 30 is knitted as an integrally formed panel of material. Since the trim cover 30 is integrally formed during the knitting process, secondary processing, such as sewing or other joining steps, is minimized.

In other examples, the trim cover 30 is formed by knitting two or more panels of material together. In such examples, the panels of knit material are subsequently sewn together. More than one panel of material may be required to form trim covers 30 that are secured to seats 20 with complex geometries, for example. In such instances, the trim cover 30 is formed from as few panels of knit material as possible to minimize the secondary processing.

In still other examples, the trim cover 30 is integrally knit as a single panel of material to cover the foam support members 32. Such example trim covers 30 do not have to be knit in conformance with the contours and shape of the underlying foam support members 32. Instead, the trim cover 30 is knit as a single panel of material that appears as a smooth panel across the seat 20. Such example trim covers 30 include a sufficient amount of elasticity or stretch so that the trim cover 30 can flex when the seat 20 is folded or moved.

In the example shown in FIG. 1, the trim cover 30 includes one or more knitted fastener members 50. The fastener members 50 are integrally formed in the trim cover 30 during the knitting process. The fastener members 50 are connected to a foam-facing side 52 of the trim cover 30. In the example shown (and as further shown in FIG. 2), the fastener members 50 are positioned laterally (i.e., extending from an inboard side of the seat 20 to the outboard side of the seat 20) and positioned longitudinally (i.e., extending from a rear side of the seat 20 toward a front side of the seat 20). In the example shown in FIG. 1, one fastener member 50 is positioned at or near the mating sides of the bottom middle section 42 and the front section 48 and a second fastener member 50 is positioned at or near the mating sides of the bottom middle section 42 and the bottom outboard side section 46.

In other examples, the fastener members are oriented in different directions and can be integrally knit into the trim cover 30 at various positions. In addition, the fastener members can be visible or non-visible to an observer of the seat 20 when the trim cover 30 is installed on the seat 20.

The fastener members 50 include an extension portion 54 and a male connector 56. The extension portion 54 is a planar feature of the fastener member 50 that projects away from the trim panel 64 of the trim cover 30. The male connector 56 is a rounded bulb positioned at a distal end 58 of the extension portion 54 at an end of the extension portion opposite to the trim panel 64. The male connector 56 connects inside a female connector 62 of a complimentary fastener member 60.

The complimentary fastener member 60, as will be further described below, is connected to the foam support members 32 or to other support members of the vehicle seat 20. The female connector 62 engages the fastener member 50 to connect the trim cover 30 to the vehicle seat 20. In the example shown, the female connector 62 projects upward from a base 66 of the vehicle seat 20. With this configuration, the fastener members 50 exert forces on the trim cover 30 in a direction toward the foam support members 32 when the fastener members 50 are secured to the complimentary fastener members 60. In this manner, the trim cover 30 is retained over the foam support members 32 and prevents the trim cover 30 from wrinkling, bulging or otherwise separating from the seat 20.

Referring now to FIG. 2, the fastener member 50 is integrally knitted with the trim panel 64. The trim panel 64 and the extension portion 54 can be made of any suitable yarn material such as a polyester, a polyester blend, polyamide, polyamide blend, wool or suitable combination. As such, the trim panel 64 and the extension portion 54 are pliable fabrics that can bend or shape relative to the surrounding materials (such as the foam support members 32 of the vehicle seat 20). The male connector 56 is relatively rigid as compared to the trim panel 64 and the extension portion 54. The male connector 56 is more rigid because the male connector 56 needs to remain engaged to the female connector 62 to secure the trim cover 30 over the foam support members 32 of the vehicle seat 20.

To achieve the rigid properties of the male connector 56, the male connector 56 is knit with a heat-activated yarn. The heat-activated yarn, in this example, is a bonding yarn that is made of material that melts at a predetermined temperature and fuses to surrounding elements such as adjacent yarns, fibers or adjacent structures. Such bonding yarns include, for example, yarns with threads made of low melt polyamides, copolyamides, low melt polyesters, co-polyesters and the like.

The male connector 56, in the example shown, is knit with such a bonding yarn with the rounded structure as previously described. After the trim cover 30 is knit with the integrally formed male connector 56, heat is applied to the trim cover 30 and/or to the fastener member 50. When a sufficient amount of heat is applied for a predetermined heating time, the bonding yarn in the male connector 56 melts and the bonding yarn fuses with surrounding threads of non-bonding material and creates the male connector 56 that has a rigid structure.

Any suitable source of heat can be used to melt the bonding yarn in the fastener member 50. In one example, the trim cover 30 is placed inside an oven and subjected to suitable elevated temperatures. In other examples, the trim cover 30 is heated using heat guns, steam wands or other heating devices. As can be appreciated, these types of heating devices can be used to heat the fastener member(s) 50 of the trim cover 30.

The trim cover 30 and/or the fastener member 50, in the example shown in FIG. 2, includes a single layer of fabric. In other examples, the trim cover 30 and/or the fastener member 50 is made of more than one layer of knitted fabric. The trim cover 30 and the fastener member 50, with either alternative structure, is integrally knitted. The trim cover 30 is integrally formed using a knitting process such that the fastener member 50 does not need to be connected to the trim cover 30 using a secondary process. The elimination of secondary processing of the trim cover 30 reduces manufacturing time and cost and reduces the likelihood of manufacturing defects.

The complimentary fastener member 60, as shown in the example of FIG. 2, has a two-piece construction. In the example shown, the female connector 62 is a length of extruded thermoplastic material. The riser portion 68 is a length of fabric or other flexible material. The female connector 62 is attached to a riser portion 68 using stitches, adhesive or other suitable attachment method. As can be appreciated, the complimentary fastener member 60 can also be integrally knitted with one-piece construction. In such an example, the riser portion 68 and the female connector 62 are integrally knitted. At least a portion of the female connector 62 is knitted with the bonding yarn previously described. The complimentary fastener member 60 is then subjected to a sufficient amount of heat to cause the bonding yarn to melt. After the complimentary fastener member 60 is cooled, the complimentary fastener member 60 hardens with a relatively rigid structure.

As shown in FIG. 3, another example fastener member 50 includes a hook portion 70. The hook portion 70 has a J-shape with a barbed end that engages a channel portion 72 of the example complimentary fastener member 60. The fastener member 50 and the complimentary fastener member 60 are similarly constructed as previously described. The fastener member 50 is integrally knitted with the trim cover 30. At least a portion of the hook portion 70 of the fastener member 50 is made of the bonding yarn such that the hook portion 70 hardens into a relatively rigid material after being heated to a predetermined temperature above the melting temperature of the bonding yarn.

Figure 4:
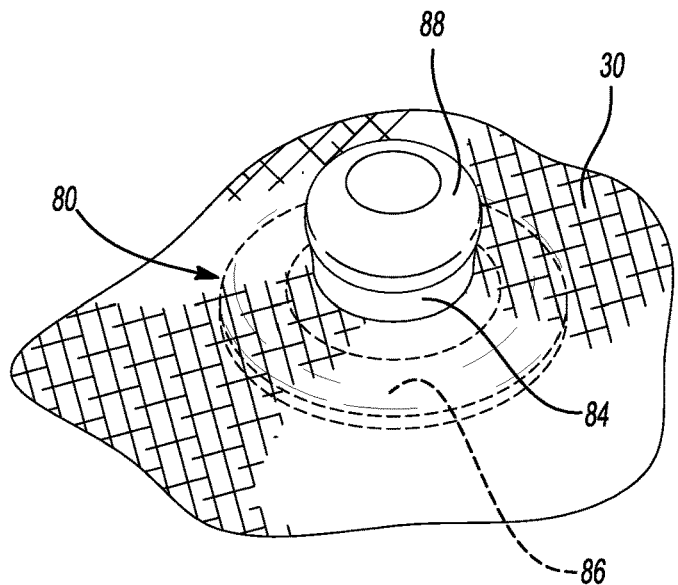
FIG. 4 is an illustration of an example trim cover including a male half of a snap connector.
Figure 5:
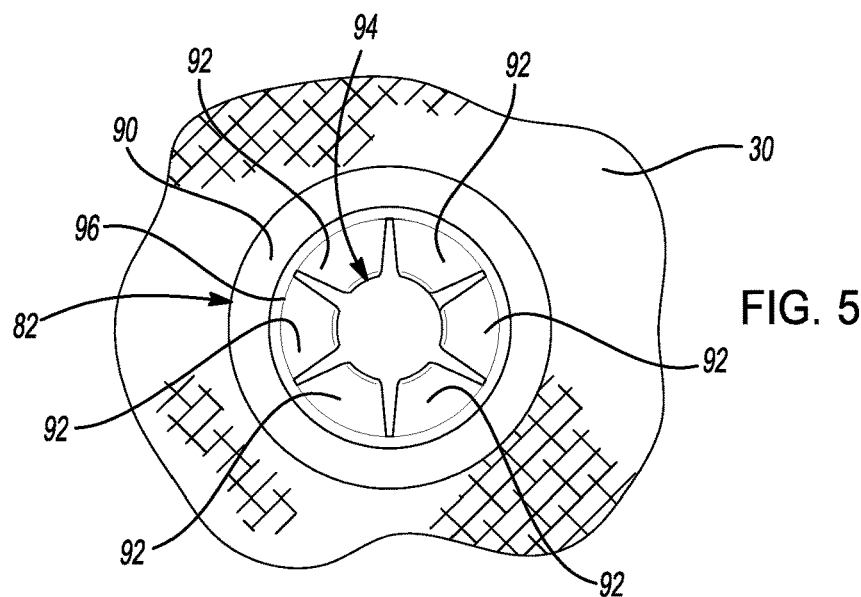
FIG. 5 is an illustration of a female half of the snap connector of FIG. 4.
Figure 6:
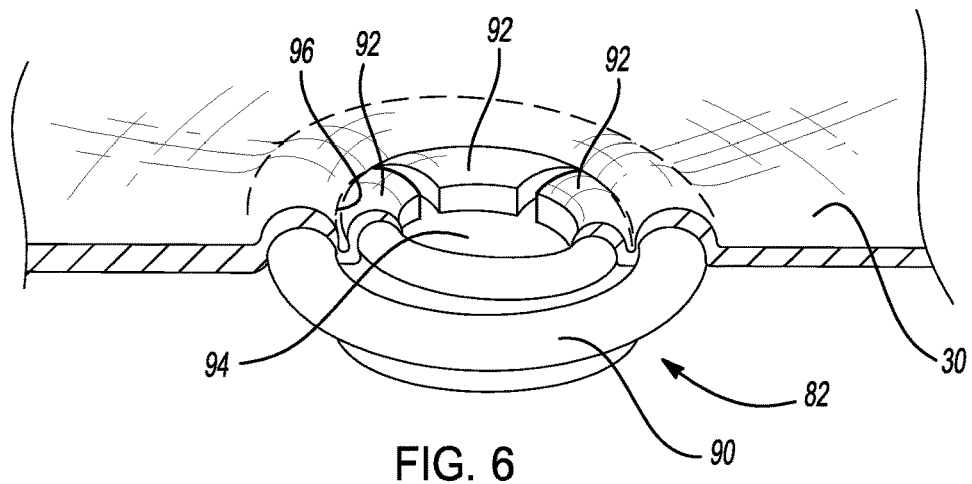
FIG. 6 is a cut-away view of the female half of the snap connector of FIG. 5.

In another example, shown in FIGS. 4-6, the trim cover 30 includes a fastener member 50 and/or a complimentary fastener member 60 that is in the form of a snap connector. In this example, the trim cover 30 includes a male half 80 and/or a female half 82 of a snap connector. As shown in FIG. 4, the male half 80 of the snap connector includes a projection 84 and a base 86. The base 86 is a circular formation embedded in the trim cover 30. The projection 84 projects away from the base 86 and has a rounded end 88.

The female half 82 of the snap connector, as shown in FIG. 5, includes a foundation portion 90 and one or more leaves 92. The foundation portion 90 is an annular shaped feature and is embedded in the trim cover 30. The leaves 92 project inward from an inner diameter 96 of the foundation portion 90. The edges of the leaves 92 that are positioned opposite to the inner diameter 96 define a circular snap opening 94. The snap opening 94 has a diameter that is greater than an outer diameter of the rounded end 88 of the projection 84 of the male half 80. The projection 84 of the male half 80 connects to the female half 82 when the projection 84 is inserted into the snap opening 94 of the female half 82. The leaves 92 deflect to permit the projection 84 to project through the snap opening 94. The interference between the leaves 92 and the projection 84 retains the male half 80 relative to the female half 82.

The male half 80 and/or the female half 82 are integrally knitted into the trim cover 30. At least a portion of the male half 80 and/or the female half 82 are knitted with the bonding yarn. The male half 80 and/or the female half 82 are heated, after the knitting process, to a predetermined temperature above the melting temperature of the bonding yarn. After the male half 80 and/or the female half 82 are cooled, the knitted material that includes the bonding yarn hardens into a relatively more rigid material than the surrounding trim cover 30.

The female half 82 is knitted, in this example, with different proportions of bonding yarn and conventional yarn to cause portions of female half 82 to have different relative rigidity. The leaves 92, in this example, have a different proportion of bonding yarn to conventional yarn than the foundation portion 90. As such, the leaves 92 are relatively more compliant than the foundation portion 90. In other examples, other portion of the female half 82 and/or the male half 80 can have different relative rigidities.

The male half 80 and or the female half 82 are knitted into the trim cover 30 at various positions. Thus, the male half 80 and the female half 82 can be connected to one another to secure the trim cover 30 to the vehicle seat 20. In other examples, one-half of the snap connector (i.e., either the male half 80 or the female half 82) is a half of a traditional (non-knitted) snap connector. Such a non-knitted half of the snap connector is mechanically connected to the vehicle seat 20. In these examples, the trim cover 30 includes the other complimentary half of the snap connector integrally knitted into the trim cover 30. Such knitted half of the snap connector is then connected to the traditional (non-knitted) half of the snap connector to secure the trim cover 30 to the vehicle seat 20.

Referring now to FIGS. 7-9, another example fastener member 50 includes an extension arm 100, a neck portion 102 and a head portion 104. In this example, the extension arm 100, the neck portion 102 and the head portion 104 are integrally knitted with the trim cover 30. The extension arm 100 is an elongated piece of fabric that extends away from the trim cover 30. The neck portion 102 and the head portion 104 are positioned at an end of the extension arm 100 opposite to the trim cover 30 with the neck portion 102 positioned between the extension arm 100 and the head portion 104. The head portion 104 has a width W1 and the neck portion has a width W2. The neck portion 102 has a reduced width and separates the head portion 104 from the extension arm 100. As such, the width W2 is smaller than the width W1.

The fastener member 50 connects to a mating panel 106 that includes a slot 108. In one example, the mating panel 106 is positioned on the vehicle seat 20. The slot 108 is elongated in a longitudinal direction and includes a rotation portion 110 at one end thereof. The slot 108 has a length L that is greater than the width W1 of the head portion 104 of the fastener member 50.

With this configuration, the fastener member 50 is retained to the mating panel 106 by inserting the head portion 104 through the slot 108. As shown in FIG. 8, the head portion 104 is aligned in the longitudinal direction of the slot 108 so that the head portion 104 can pass through the mating panel 106. Once inserted, the fastener member 50 is rotated in the rotation portion 110 of the slot 108. This rotation of the fastener member 50 positions the head portion 104 out of alignment with the longitudinal direction of the slot 108. In such a position, the head portion 104 prevents the fastener member 50 from being removed from the slot 108.

In the example shown, at least a portion of the head portion 104 and/or the neck portion 102 is knitted with the bonding yarn. The head portion 104 and/or the neck portion 102 of the fastener member 50 is more rigid than surrounding portions of the fastener member 50. The head portion 104 and/or the neck portion 102 is heated to a predetermined temperature in excess of the melting temperature of the bonding yarn and then is permitted to cool. This process causes the head portion 104 and/or the neck portion to harden. The fastener member 50 is more difficult to remove from the slot 108 when the head portion 104 and/or the neck portion 102 is relatively more rigid than the surrounding portions of the fastener member 50. Thus, the fastener member 50 securely retains the trim cover 30 in a desired position on the vehicle seat 20.

Figure 10:
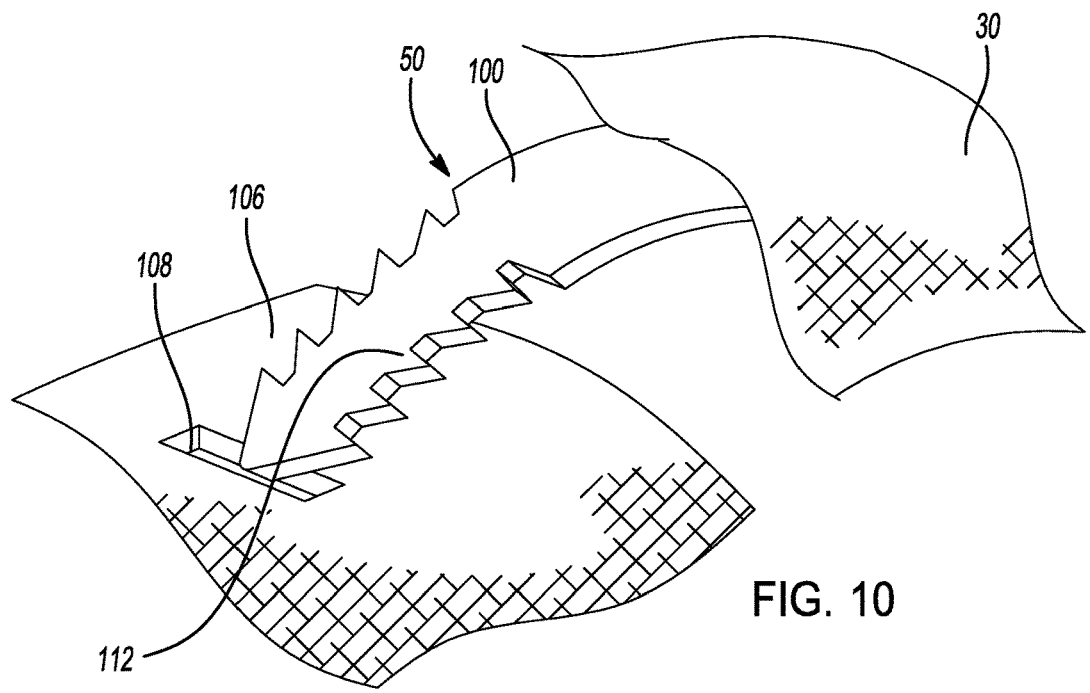
FIG. 10 is an illustration of another example fastener member being inserted into the mating panel.
Figure 11:
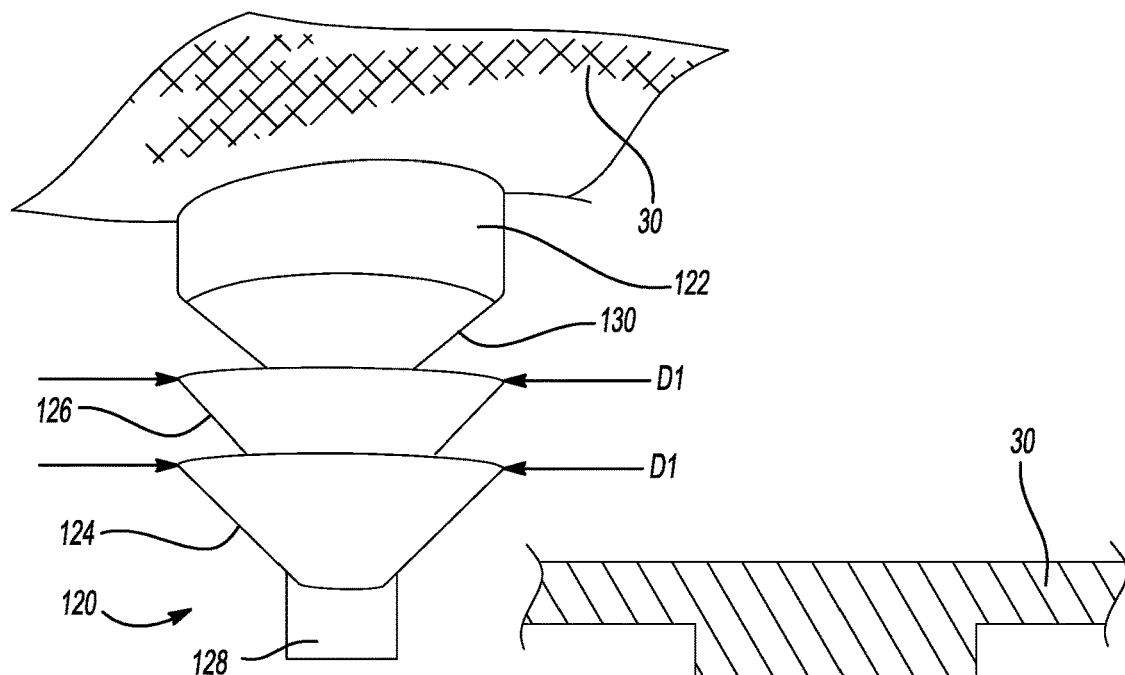
FIG. 11 is an illustration of another example fastener member attached to a trim cover.
Figure 12:
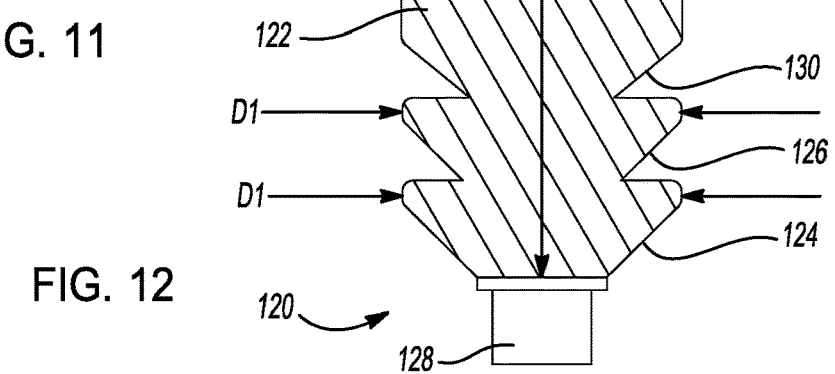
FIG. 12 is a sectional view of the fastener member of FIG. 11 shown in a relaxed state.
Figure 13:
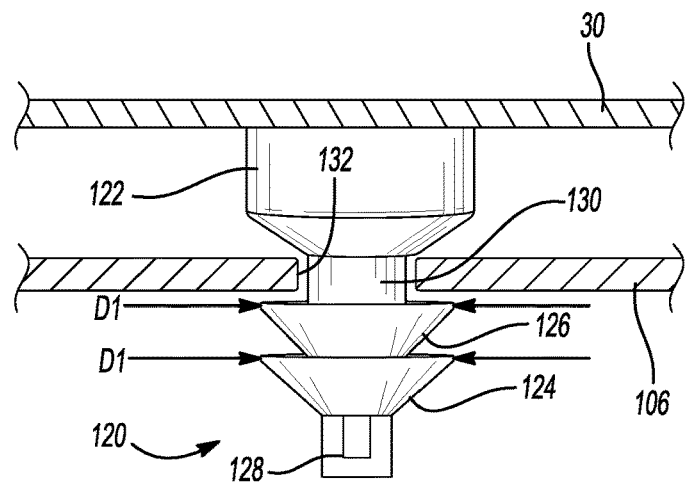
FIG. 13 is an illustration of the example fastener member of FIG. 11 inserted through a hole in a mating panel.

In an example shown in FIG. 10, the fastener member 50 has a structure similar to that previously described. In this example, the fastener member 50 includes a saw-tooth head portion 112. The saw-tooth head portion 112 includes a first arrowhead positioned at a distal end of the fastener member 50 followed by truncated arrowhead portions connected to one another. As can be appreciated, the saw-tooth head portion 112 is inserted through the slot 108 as previously described. Because the saw-tooth head portion 112 include multiple successive arrowhead portions, the fastener member 50 can be secured to the mating panel 106 at multiple positioned effectively changing the distance at which the trim cover 30 is secured from the mating panel 106.

The saw-tooth head portion 112, in this example, is integrally knitted with the trim cover 30. At least a portion of the saw-tooth head portion 112 is knitted with the bonding yarn. In such examples, the saw-tooth head portion 112 is heated to a predetermined temperature above the melting temperature of the bonding yarn and then permitted to cool. After such heating process, the saw-tooth head portion 112 is relatively more rigid than the surrounding regions of the trim cover 30.

In still another example, the trim cover 30 includes an elastic fastener member 120. In this example, as shown in FIGS. 11-15, the fastener member 120 projects away from the trim cover 30. The fastener member 120 includes a stem portion 122, a first gripping portion 124, a second gripping portion 126 and a pull tab 128. The stem portion 122, in the example shown, is cylindrical and projects away from the trim cover 30. The first gripping portion 124 and the second gripping portion 126 are frusto-conical in shape and are axially connected at a side of the stem portion 122 opposite to the trim cover 30. The pull tab 128 is a flap or loop of material that extends from the first gripping portion 124.

The fastener member 120 is integrally knitted with the trim cover 30. Portions of the fastener member 120 are knitted with a combination of the bonding yarn and an elastic yarn. A combination of the bonding yarn and an elastic yarn results in a knitted object with the rigidity to maintain a 3-dimensional shape that projects from the trim cover 30. The combination of bonding yarn and the elastic yarn also results in a knitted object that can elastically deform. Any suitable elastic yarn can be used such as yarns made of polyester polymer fibers including polybutylene terephthalate (PBT) fibers, polytrimethylene terephthalate (PTT) fibers, polyethylene terephthalate (PET) fibers or the like.

Figure 14:
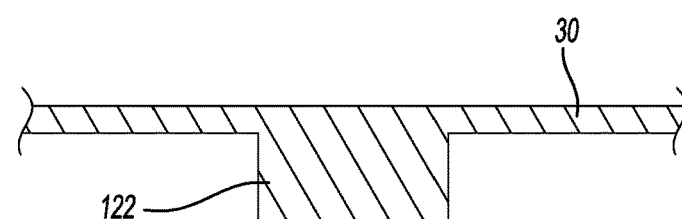
FIG. 14 is a sectional view of the fastener member of FIG. 11 shown in an extended state.
Figure 15:
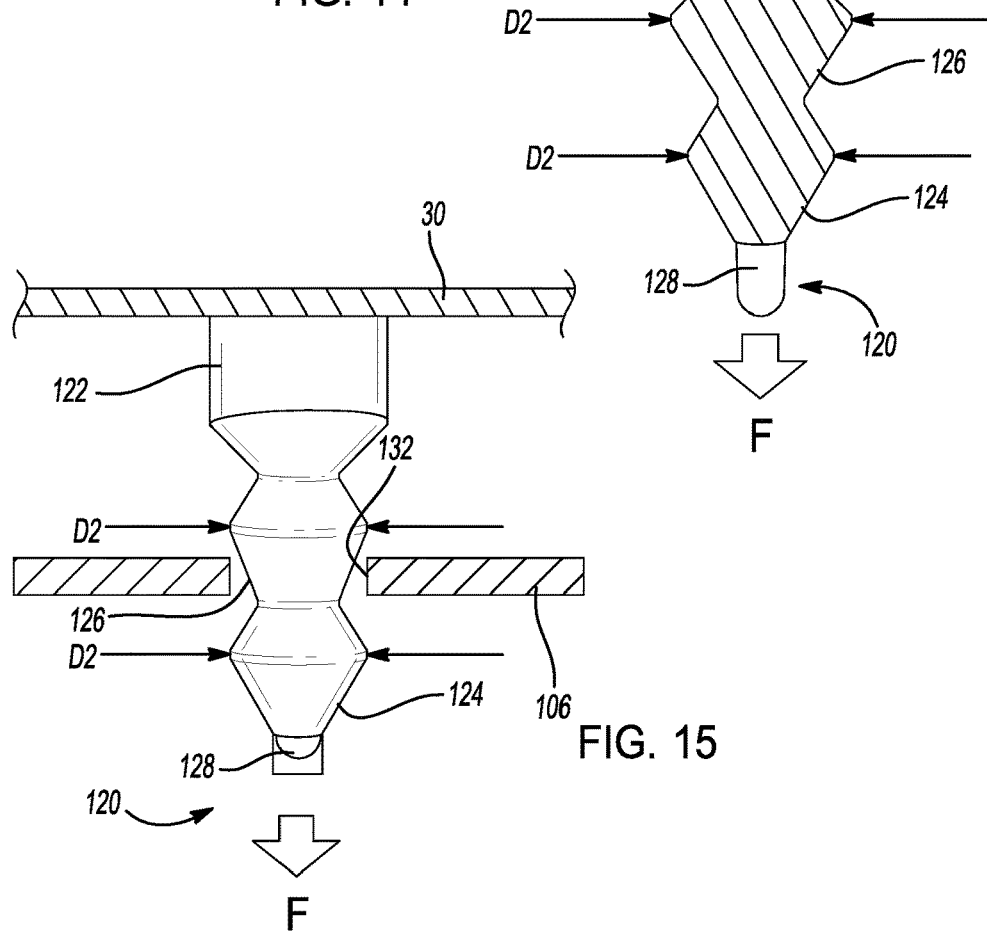
FIG. 15 is an illustration of the fastener member of FIG. 11 shown in the extended state being removed from the hole in the mating panel.
Figure 16:
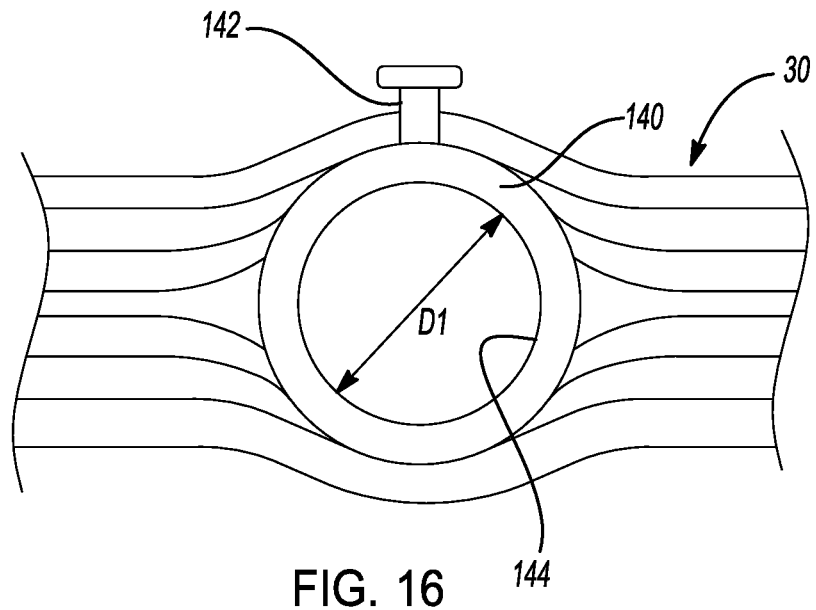
FIG. 16 is an illustration of an example inflatable fastener member shown in a relaxed state.

The fastener member 120 retains the trim cover 30 to the mating panel 106 when in a relaxed state (FIGS. 11-13) and is removable from the mating panel 106 when in an extended state (FIGS. 14 and 15). In the relaxed state, the first gripping portion 124 and the second gripping portion 126 have an outer diameter of D1. In the extended state, the first gripping portion 124 and the second gripping portion have an outer diameter of D2. The diameter D1 (relaxed state) is greater than the diameter D2 (extended state). The fastener member 120 is extended by pulling on the pull tab 128 with a sufficient pulling force in a direction away from the trim cover 30 as indicated by the pull force F.

As shown, the fastener member 120 elongates in response to the pull force F. As the fastener member 120 elongates, the angled outward surface of the first gripping portion 124 and the second gripping portion 126 changes and moves toward the vertical direction. During this movement, the outer diameter of the first gripping portion 124 and the second gripping portion changes from D1 to D2. Thus, the outer diameter of the fastener member 120 is reduced when the pull force F is applied.

The fastener member 120 retains the trim cover 30 relative to the mating panel 106 (FIG. 13) when the fastener member 120 is inserted through a hole 132 in the mating panel 106. In the example shown, the mating panel 106 is positioned between the stem portion 122 and the second gripping portion 126 at an intermediate portion 130. To remove the fastener member 120, the pull force F is applied to the pull tab 128 in a direction away from the trim cover 30. The first gripping portion 124 and the second gripping portion 126 elongate as previously described and the outer diameter changes from D1 to D2. The fastener member 120, with the pull force F applied, is removable from the hole 132 of the mating panel 106 (FIG. 15).

Figure 17:
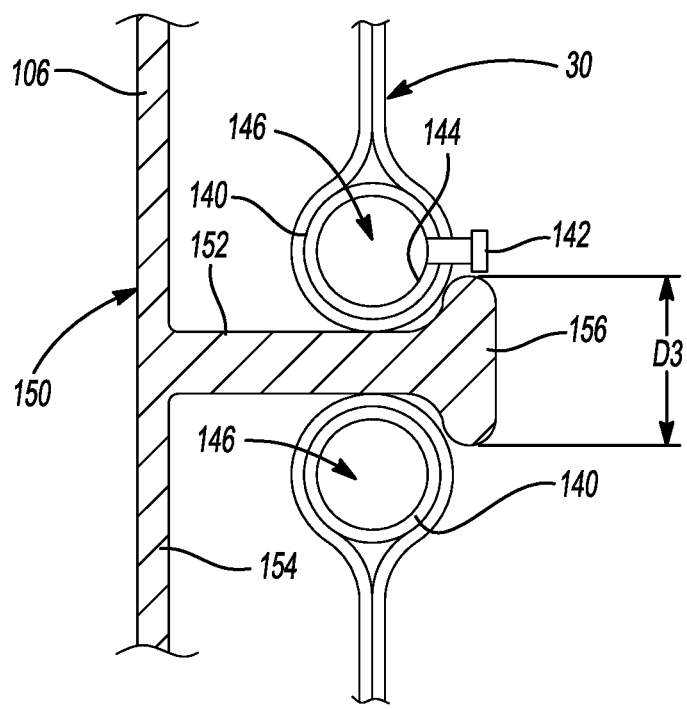
FIG. 17 is a side sectional view of the inflatable fastener member of FIG. 16 secured to a mating panel with a complimentary fastener member.
Figure 18:
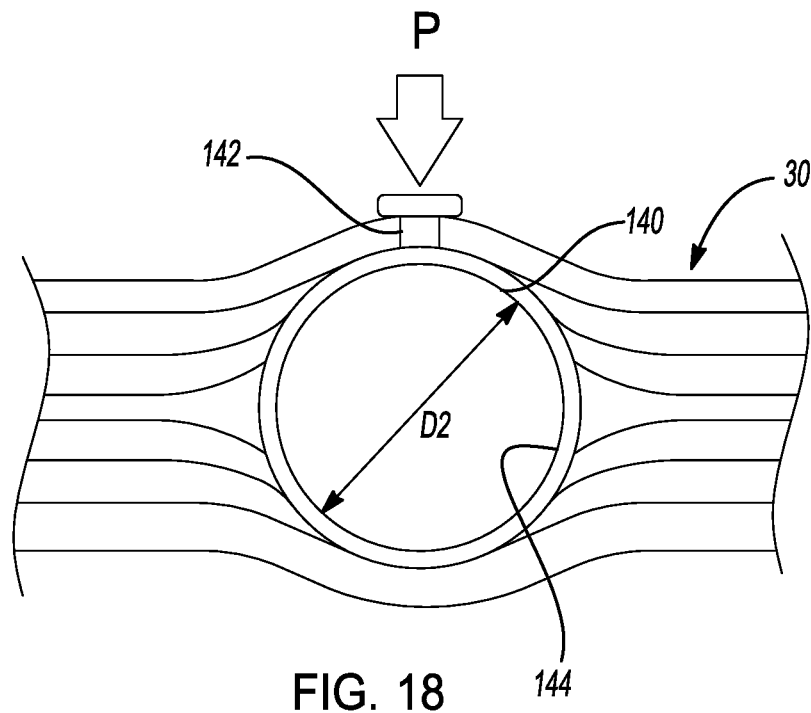
FIG. 18 is an illustration of the inflated fastener member of FIG. 16 shown in an expanded state.
Figure 19:
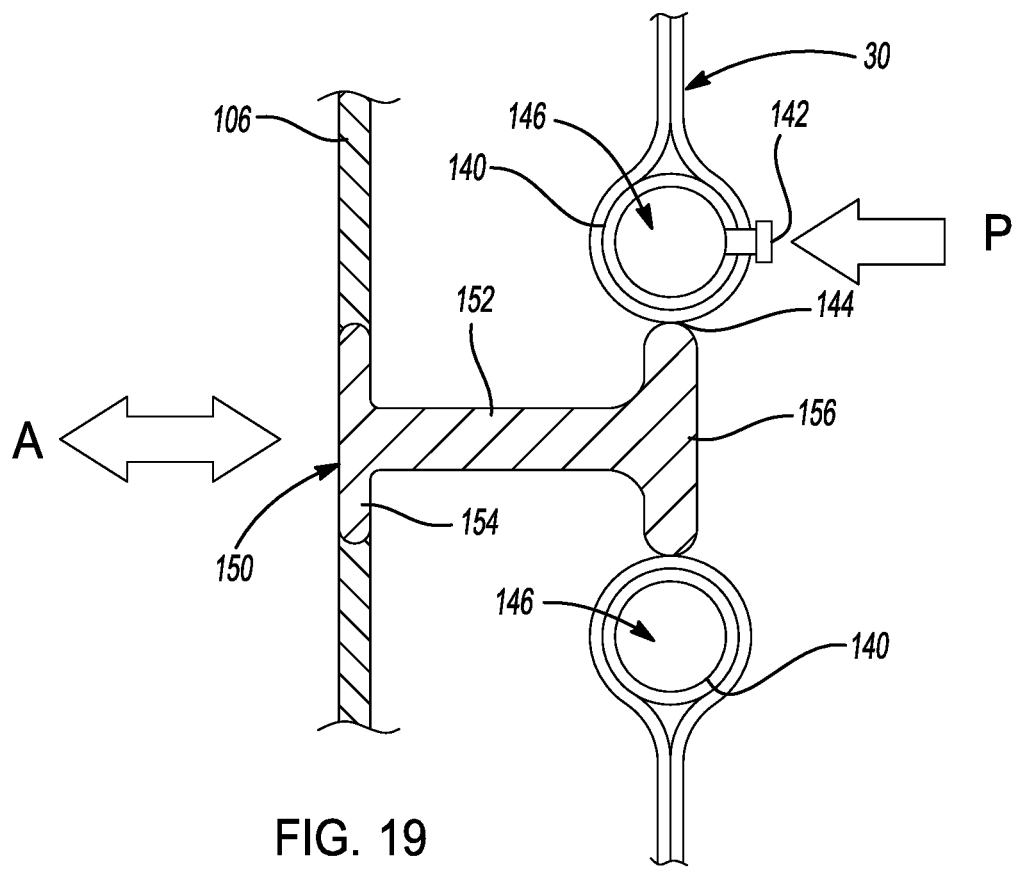
FIG. 19 is a side sectional view of the inflatable fastener member of FIG. 16 shown in the expanded state with the complimentary fastener member being removed.

In another example shown in FIGS. 16-19, the trim cover 30 includes an inflatable fastener member 140. The inflatable fastener member 140 is annular in shape to define an internal aperture 144. The fastener member 140 is integrally knitted in the trim cover 30. As will be further described, the fastener member 140 is knit with the bonding yarn with a cavity 146 that can be filled with a volume of pressurized air (or other suitable fluid) to inflate the fastener member to change the size of the internal aperture 144. In the example shown, the internal aperture 144 changes from a relaxed diameter D1 (FIGS. 16 and 17) to an expanded diameter D2 (FIGS. 18 and 19). The expanded diameter D2 is greater than the relaxed diameter D1. A complimentary fastener member 150 is removable from the fastener member 140 when the fastener member is in the expanded state with the expanded diameter D2. The complimentary fastener member 150 is retained in the internal aperture 144 when the fastener member 140 is in the relaxed state with the relaxed diameter D1.

The fastener member 140, in the example shown, is knit with the bonding yarn with an annular shape. The fastener member 140 includes the cavity 146. The fastener member 140 also includes an inflation port 142. The inflation port 142 is a cylindrical tube member that fluidly connects the cavity 146 to the external environment. As shown, the inflation port 142 extends through one or more layers of the trim cover 30 to permit a pressurized fluid source to be connected to the fastener member 140 to inflate the fastener member from the relaxed state to the expanded state.

As can be appreciated, a heat source is applied to the fastener member 140 after the fastener member 140 is knitted with the previously described structure. The bonding yarn that is used in, at least, a portion of the fastener member 140 melts and fuses with surrounding elements to fluidly seal the cavity 146 and permits the cavity 146 to be filled with a volume of pressurized fluid. In addition to the bonding yarn, other types of yarn, such as elastic yarns, plastic yarns, or other suitable yarns can be knit into the fastener member 140 to permit the fastener member 140 to inflate from the relaxed state to the expanded state.

In the relaxed state, the pressure inside the cavity 146 is equalized with the air pressure surrounding the fastener member 140. In the relaxed state, the internal aperture 144 has the relaxed diameter D1. The complimentary fastener member 150 is retained relative to the fastener member 140 when the fastener member is in the relaxed state.

As shown in FIG. 17, the complimentary fastener member 150, in this example, includes a foot 154, a post 152 and a head 156. The complimentary fastener member 150 is connected to the mating panel 106 by the foot 154. The post 152 is a cylindrical projection that extends away from the foot 154 and is connected to the head 156 such that the foot 154 and the head 156 are connected at opposite ends of the post 152.

The foot 154 and the head 156 are circular and are disc-shaped. The head 156 has a head diameter D3. The head diameter D3 is greater than the diameter D1 of the internal aperture 144 when the fastener member 140 is in the relaxed state. The head diameter D3 is less than the diameter D2 of the internal aperture 144 when the fastener member 140 is in the expanded state. This relative sizing of the head 156 to the diameter of the internal aperture 144 permits the complimentary fastener member 150 to be alternatively retained or removable from the fastener member 140.

During use, the fastener member 140 operates in the relaxed state with the internal aperture 144 having a diameter D1. To insert the complimentary fastener member 150, a source of pressurized air P (FIG. 18) is applied to the inflation port 142. The pressurized air (or other suitable pressurized fluid) causes the fastener member 140 to expand to the expanded state in which the internal aperture has the expanded diameter D2. In the expanded state, the complimentary fastener member 150 can be inserted into (or removed from) the internal aperture 144 in the direction shown by arrow A (FIG. 19). When the pressure inside the cavity 146 is permitted to equalize with the surrounding ambient air pressure through the inflation port 142, the fastener member 140 returns to the relaxed state. In the relaxed state, the internal aperture 144 returns to the relaxed diameter D1. The complimentary fastener member 150 is captured by the fastener member 140 in the relaxed state as shown (FIG. 17).

In the relaxed state, the trim cover 30 is retained relative to the mating panel 106. The complimentary fastener member 150 is removed from the fastener member 140 by causing the fastener member 140 to move to the expanded state and then removing the complimentary fastener member 150 through the internal aperture 144.

In the example shown, the fastener member 140 and the complimentary fastener member 150 have circular shapes. In other examples, other shapes, profiles and relative sizes of the fastener member 140 and the complimentary fastener member 150 can also be used. For example, the internal aperture 144 can have a teardrop, oval or other shape.

Referring now to FIGS. 20-23, in another example, the trim cover 30 includes a narrowing fastener member 160. The fastener member 160, in this example, moves from a relaxed state (FIGS. 20-21) to a narrowed state (FIGS. 22-23) when a vacuum V is applied to the fastener member 160. The fastener member 160 is integrally formed with the trim cover 30 and retains the trim cover 30 relative to the mating panel 106 when the fastener member 160 is in the relaxed state. When a vacuum V is applied to the fastener member 160, the profile of the fastener member 160 narrows moving the fastener member 160 to the narrowed state. In the narrowed state, the fastener member 160 can be inserted (or removed) through an opening 170 in the mating panel 106.

The fastener member 160, in the example shown, includes a collar 162, a stem 166 and a bulb 168. The collar 162 is a circular disc-shaped portion of the fastener member 160 that is embedded in the trim cover 30. The stem 166 is cylindrical, in this example, and extends from the collar 162 to the bulb 168. The stem 166 separates the collar 162 from the bulb 168. As shown, the mating panel 106 is captured by the fastener member 160 between the collar 162 and the bulb 168 on the stem 166.

Figure 23:
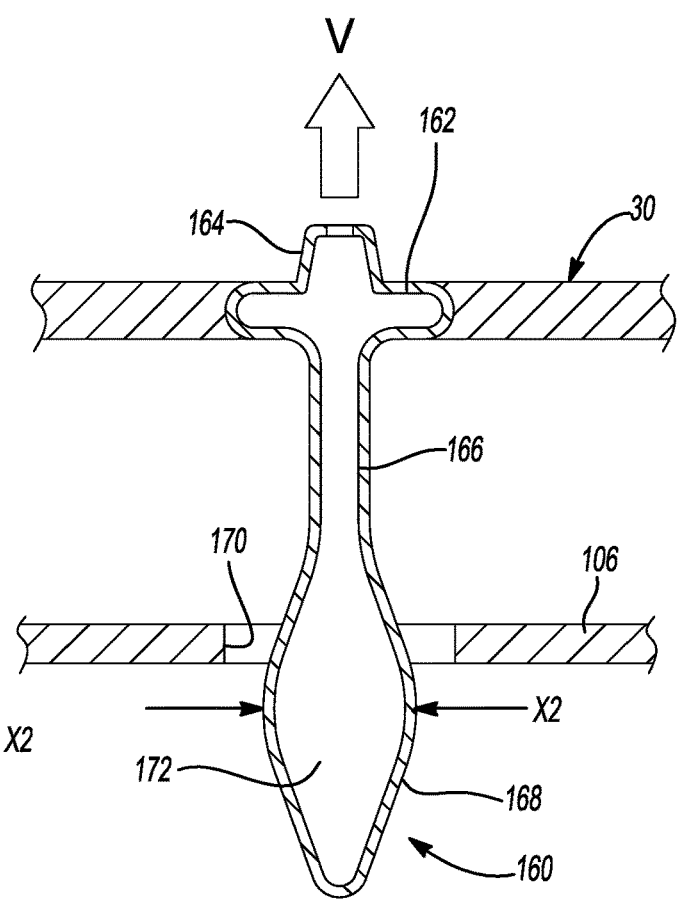
FIG. 23 is a sectional view of the narrowing fastener member of FIG. 20 shown in the narrowed state being removed from the mating panel.

The fastener member 160 is hollow with an inner chamber 174. The walls of the fastener member 160 are formed such that the inner chamber 174 can be subjected to a vacuum to cause the fastener member 160 to move from the relaxed state to the narrowed state. As shown in FIG. 23, the vacuum V is applied to a pressure duct 164 that is in fluid communication with the inner chamber 174. When the pressure inside the inner chamber 174 is less than the external pressure surrounding the bulb 168, the walls of the bulb 168 move toward one another causing a waist portion 172 of the bulb 168 to narrow. When the waist portion 172 of the bulb 168 narrows, the fastener member 160 moves from the relaxed state to the narrowed state.

Figure 20:
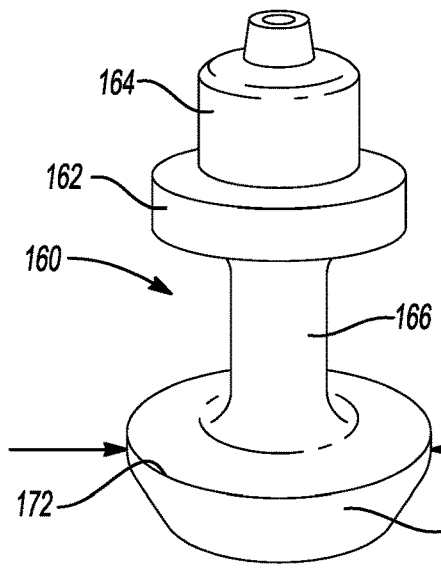
FIG. 20 is an illustration of an example narrowing fastener member shown in a relaxed state.
Figure 21:
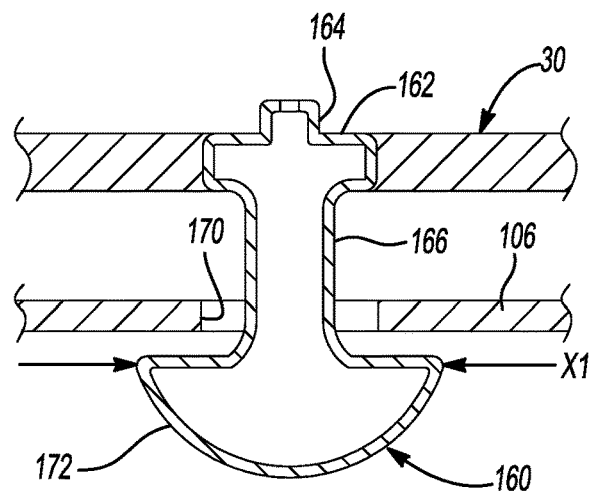
FIG. 21 is a sectional view of the narrowing fastener member of FIG. 20 shown secured to a mating panel.
Figure 22:
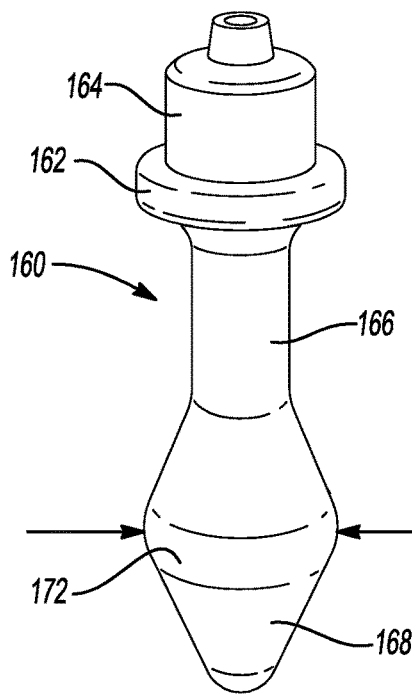
FIG. 22 is an illustration of the narrowing fastener member of FIG. 20 shown in a narrowed state.

As shown in FIGS. 20 and 21, the waist portion 172 has an outer diameter X1 in the relaxed state. In the narrowed state, as shown in FIGS. 22 and 23, the waist portion 172 has an outer diameter X2. The opening 170 in the mating panel 106 has in inner diameter between X1 and X2. Thus, the fastener member 160 is retained in the mating panel 106 when the fastener member 160 is in the relaxed state and is removable from (or insertable into) the opening 170 of the mating panel 106 when the fastener member 160 is in the narrowed state.

The fastener member 160, in the example shown, is integrally knitted into the trim cover 30. At least a portion of the fastener member 160 is knitted with the bonding yarn during the knitting process. After the fastener member 160 is heated to a temperature greater than the melting temperature of the bonding yarn and then is subsequently cooled, the bonding yarn fuses with the surrounding yarns and/or fibers to create the fastener member 160 with the inner chamber 174.

The fastener member 160, in the example shown, has a circular cross-sectional shape of varying diameters. In other examples, the fastener member 160 can have other cross-sectional shapes. In addition, the bulb 168 can have other shapes as well. For example, the bulb 168 can have a spherical shape, a wedge shape or other suitable profile.

In addition to the bonding yarns previously described, the fastener members or the trim covers of the present disclosure may also include one or more heat-activated yarns that include a thread or wire that is made of a shape memory alloy (SMA). Example shape memory alloy wires are made of a copper, aluminum, nickel alloy, or a nickel, titanium alloy. However, other suitable alloys can also be used. Other example shape memory alloys include iron, manganese, silicon alloys and copper, zinc, aluminum alloys. Shape memory alloys are used in the fastener members or in the trim covers of the present disclosure because the shape memory alloys have a mechanical property that causes the shape memory alloy to return to its original shape when the shape memory alloy is heated above a predetermined temperature (e.g. the temperature at which the shape memory alloy changes from martensite to austentite).

The fastener members and/or the trim covers of the present disclosure are knitted with wires made of the shape memory alloy. When the fastener members and/or the trim covers are heated to a temperature above the predetermined temperature, the shape memory alloy wires move to return to their original shapes. Such movement causes the fastener member or the trim cover into which the shape memory ally wires are knitted to move. Any suitable heating method can be used to heat the shape memory alloy wires above the predetermined temperature. The heat sources previously described can be used. In other examples, a suitable electrical power source can be applied to the shape memory alloy wires. The power source can heat the shape memory alloy wires to a temperature above the predetermined temperature. In one example, a direct current (DC) power source is used to cause an electrical signal to flow through the shape memory alloy wires. The current causes the shape memory alloy wire to heat to a temperature above the predetermined temperature. In one example, a direct current power source with a current of 1 to 1.5 Amps is used.

Figure 24:
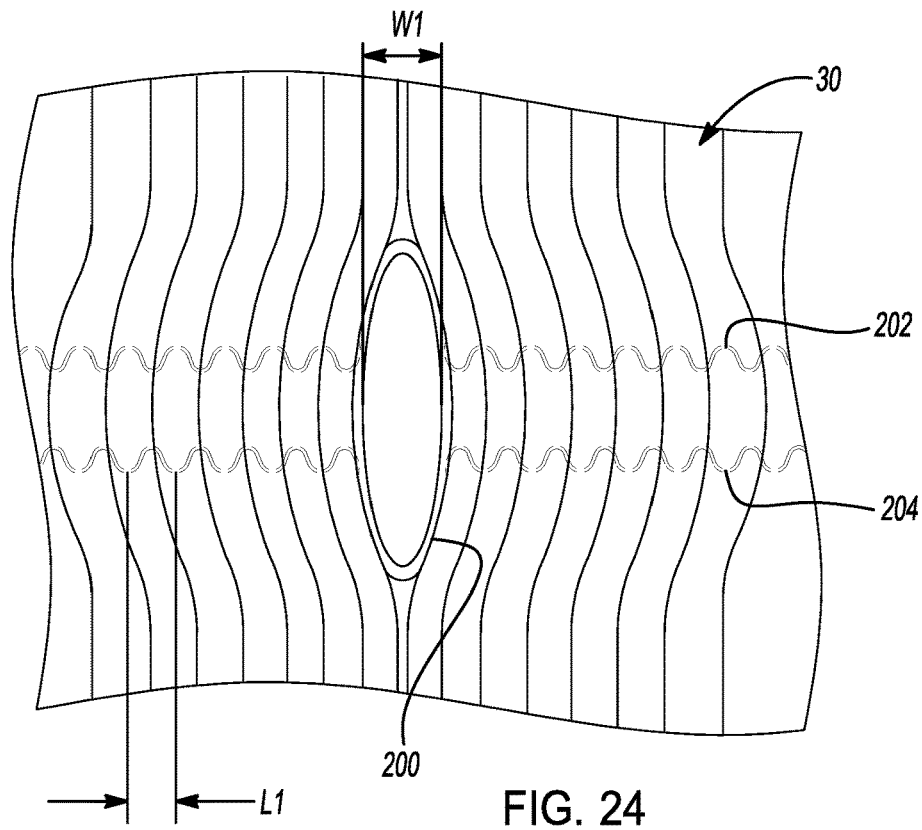
FIG. 24 is an illustration of an example trim cover shown with a fastener hole in a relaxed state.

Referring now to FIG. 24, the example trim cover 30 includes a fastener hole 200. The fastener hole 200, in the relaxed state as shown, has a lens shape. The trim cover 30 is knitted to include a first shaping wire 202 and a second shaping wire 204. The first shaping wire 202 and the second shaping wire 204 are made of a shape memory alloy. The first shaping wire 202 and the second shaping wire 204 are oriented laterally across the trim cover 30 and are positioned on opposing sides of the fastener hole 200.

The first shaping wire 202 and the second shaping wire 204 are elongated when the first shaping wire 202 and the second shaping wire 204 are knitted into the trim cover 30. As shown in the FIG. 24, the first shaping wire 202 and the second shaping wire 204 have a sinusoidal wave shape with a wave length L1. When the first shaping wire 202 and the second shaping wire 204 are in the trim cover 30 in the relaxed state, the fastener hole 202 has the lens shape as shown. Correspondingly, the fastener hole 202 has a width W1. In the relaxed state, the fastener hole 200 retains fasteners that are inserted into the fastener hole 200 that have a width that is greater than W1.

Figure 25:
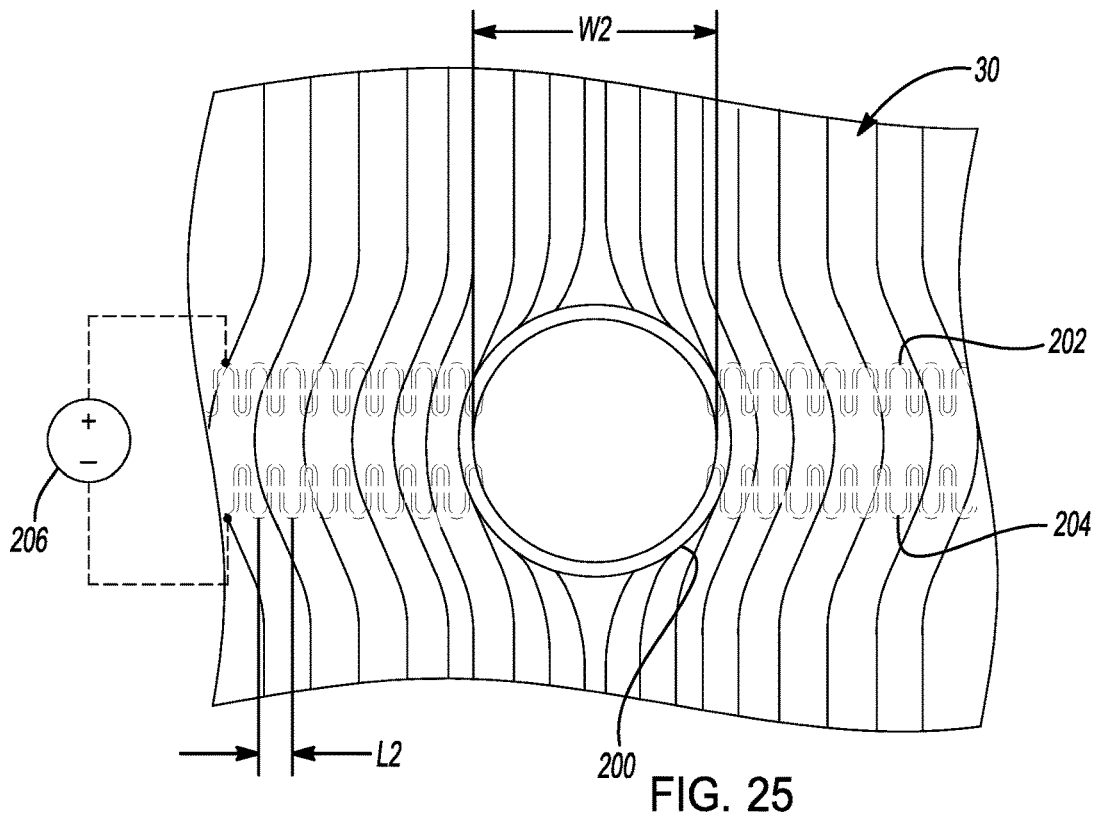
FIG. 25 is an illustration of the trim cover of FIG. 24 shown with the fastener hole in the excited state.

As shown in FIG. 25, the fastener hole 200 expands to have a width W2 when the trim cover 30 moves to the excited state. In the example shown, the first shaping wire 202 and the second shaping wire 204 are heated using a DC power source 206. When the first shaping wire 202 and the second shaping wire 204 are heated above the predetermined temperature, the first shaping wire 202 and the second shaping wire 204 move to return to their original shape. The original shape of the first shaping wire 202 and the second shaping wire 204, in this example, is a sinusoidal wave shape with a wave length L2. Since the wave length L2 is less than the wave length L1, the first shaping wire 202 and the second shaping wire 204 pull on the opposing sides of the fastener hole 200. In this manner, the fastener hole 200 moves from the lens shape (FIG. 24) to a more circular shape (FIG. 25). As this occurs, the width (or diameter) of the fastener hole 200 increases. In this example, the width of the fastener hole 200 increases from W1 to W2. As can be appreciated, fasteners that have a width greater than W1 but less than W2 fit through the fastener hole 200 in the excited state. In this manner, fasteners can be inserted through (or removed from) the fastener hole 200.

Figure 26:
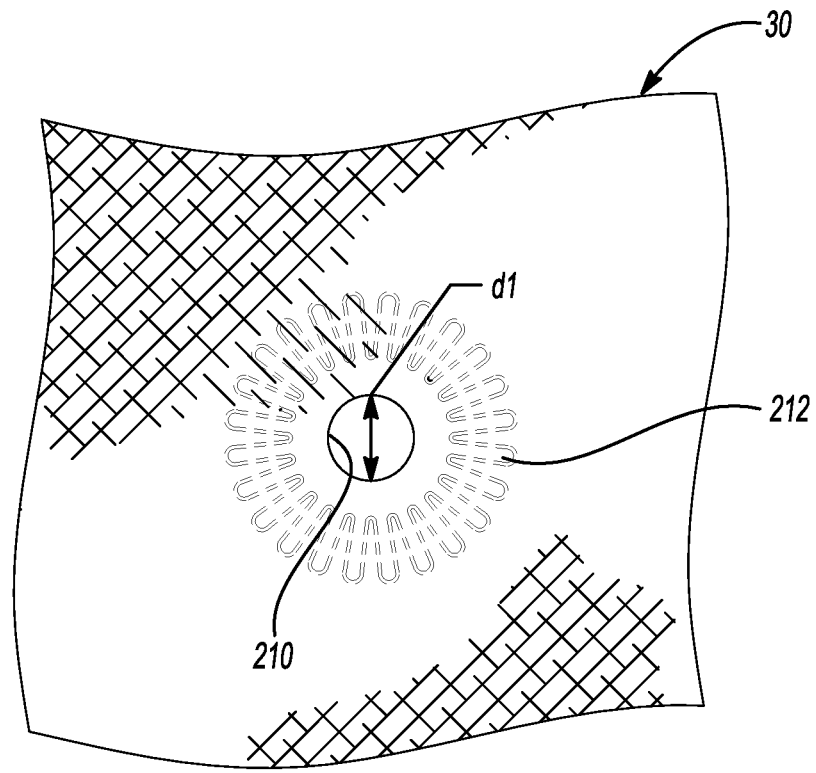
FIG. 26 is an illustration of another example trim cover shown with a fastener hole in the relaxed state.
Figure 27:
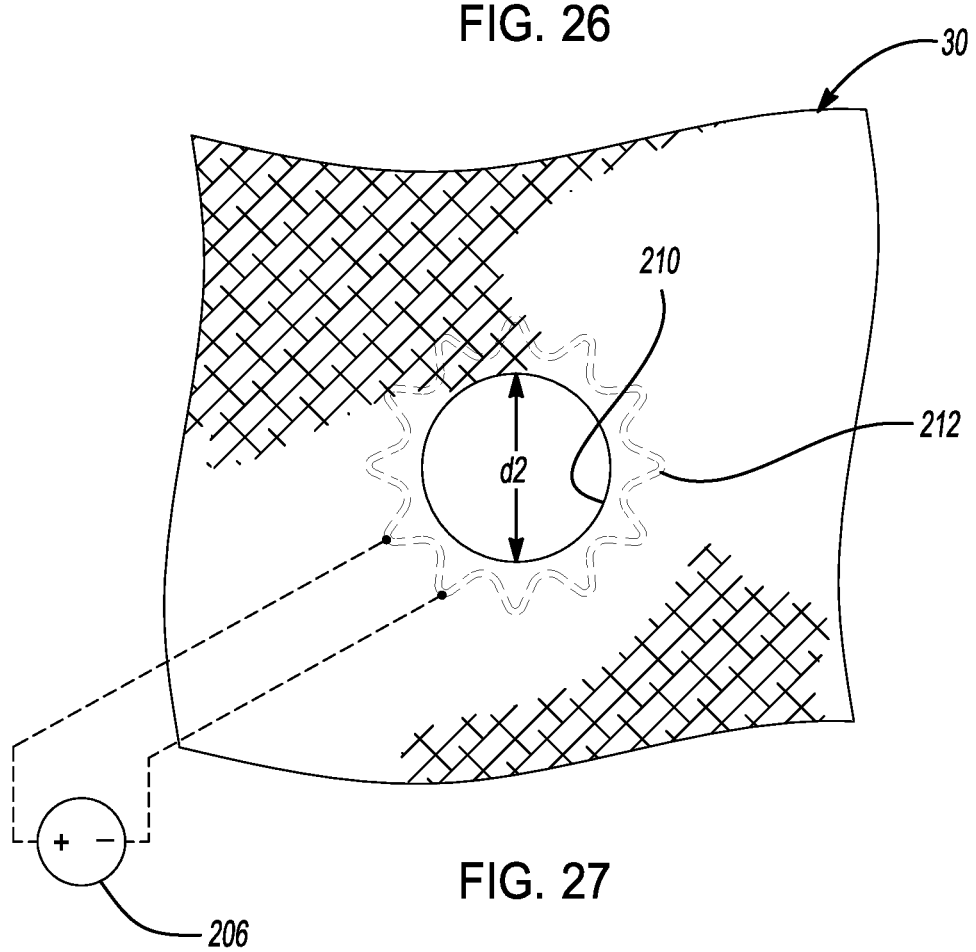
FIG. 27 is an illustration of the trim cover of FIG. 26 shown with the fastener hole in the excited state.

In another example, the trim cover 30 includes a hole shaping wire 212 knitted around a hole 210. In this example, the hole shaping wire 212 is deformed from an original straight length to have a folded profile that wraps around the hole 210. In the relaxed state (as shown in FIG. 26), the hole 210 has a diameter of d1. In the relaxed state, the hole 210 retains fasteners that are inserted through the hole 210 so long as the fastener has a width greater than d1.

When the hole shaping wire 212 is heated above the predetermined temperature, the hole shaping wire 212 attempts to return to its original straight shape. As the hole shaping wire 212 straightens, the hole shaping wire 212 pulls the hole 210 open to an expanded diameter d2. Since the expanded diameter d2 is greater than the diameter d1 of the hole 210 in the relaxed state, fasteners can be inserted into (or removed from) the hole 210 in the excited state. As shown, the hole shaping wire 212 is heated using the DC power source 206.

In another example, the trim cover 30 includes a fastener member 220 that includes a first shaping member 226 and a second shaping member 228. The fastener member 220, in this example, is a bulb-shaped projection that includes a trunk portion 222 and a cap portion 224. The trunk portion 222 projects outward from the trim cover 30. The cap portion 224 is connected to the trunk portion 222 on an end of the trunk portion 222 away from the trim cover 30.

Figure 28:
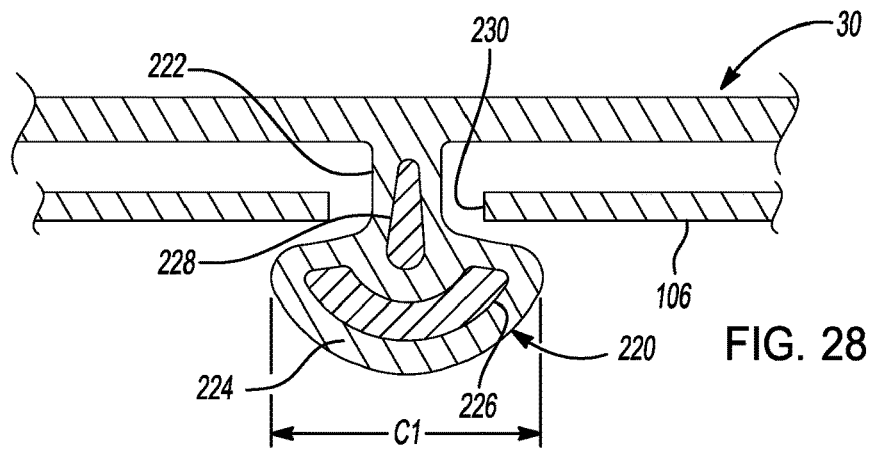
FIG. 28 is a sectional view of another example fastener member shown in a relaxed state secured to a mating panel.
Figure 29:
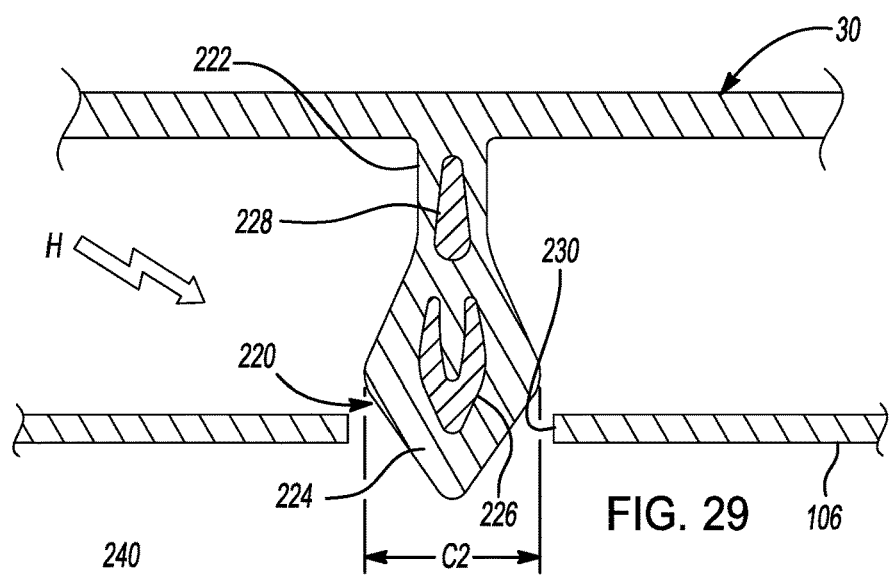
FIG. 29 is a sectional view of the fastener member of FIG. 28 shown in a excited state being removed from the mating panel.

The first shaping member 226 and the second shaping member 228 are integrally knitted into the fastener member 220 using a heat-activated yarn that includes a shape memory alloy wire. The first shaping member 226 is formed into the fastener member 220 with an arcuate shape as shown. As shown in FIG. 28, the fastener member 228 has an outer width of C1 when the fastener member 220 is in the relaxed state. In the relaxed state, the fastener member 220 retains the trim cover 30 to the mating panel 106 because the outer width C1 of the fastener member 220 is greater than a width of the opening 230 in the mating panel 106.

When heat is applied to the fastener member 220, the fastener member 220 changes shape. The first shaping member 226 and the second shaping member 228 move to return to their original shapes when the heat H is applied. The heat H raises the temperature of the first shaping member 226 and the second shaping member 228 above the predetermined temperature. In this example, the first shaping member 226 bends such that its opposite ends move toward one another. As this occurs, the cap portion 224 narrows. In the excited state, the cap portion 224 of the fastener member 220 has an outer width C2. Since C2 is less than the outer width C1, the fastener member 220 can be removed from (or inserted into) the opening 230 of the mating panel 106.

In this example, the first shaping member 226 has an arcuate shape and the second shaping member 228 has a teardrop shape. In other examples, the first shaping member 226 and the second shaping member 228 can have other suitable shapes that cause the fastener member 220 to have different shapes between the relaxed state and the excited state. In addition, the fastener member 220 can have alternate profiles as well.

Figure 30:
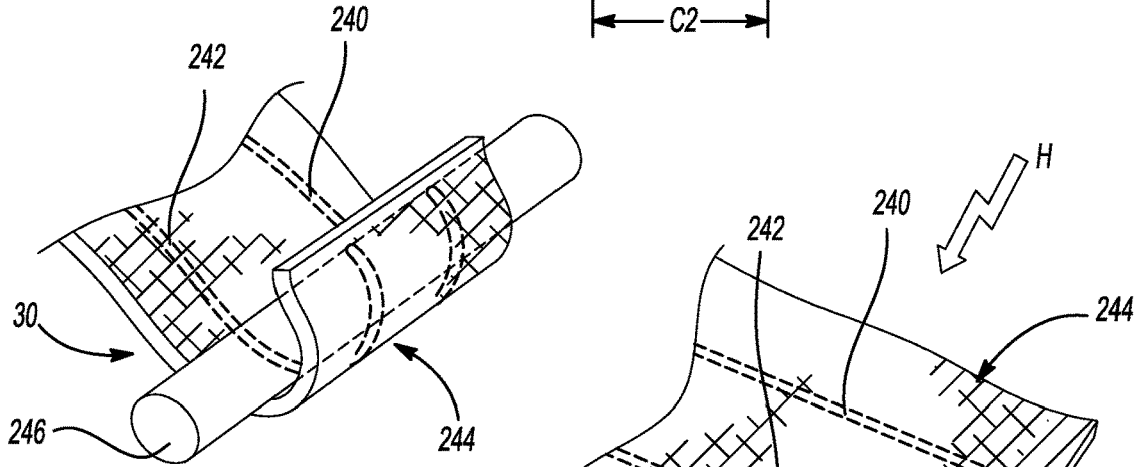
FIG. 30 is an illustration of another example fastener member shown in a relaxed state secured to a support bar.

On such alternate shape is shown in FIG. 30. In this example, the trim cover 30 includes a J-shaped gripping member 244. As shown, the trim cover 30 is integrally knitted with a heat-activated yarn that includes a first shaping wire 240 and a second shaping wire 242. The gripping member 244 is shaped with a curved J-shape such that, in the relaxed state, the gripping member 244 wraps around a support bar 246. The support bar 246, for example, is a structural member of the vehicle seat 20. In the relaxed state, the gripping member 244 retains the trim cover 30 to the support bar 246.

Figure 31:
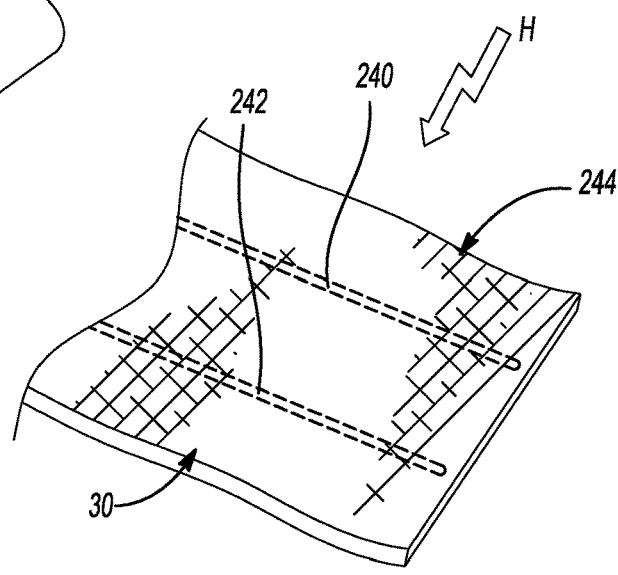
FIG. 31 is an illustration of the fastener member of FIG. 30 shown in a excited state.

When heat is applied to the gripping member 244, the first shaping wire 240 and the second shaping wire 242 move to return to an original straight shape. As shown in FIG. 31, the first shaping wire 240 and the second shaping wire 242 cause the gripping member 244 to move to a planar shape when in the excited state. In the excited state, the gripping member 244 (and the trim cover 30) can be removed from the support bar 246 or other support structure.

Referring now to FIGS. 32-36, another example fastener member 300 includes three different types of heat-activated yarns. The fastener member 300 includes a bonding yarn, as previously described, a pre-stretched elasticized yarn and a heat-generating yarn. The bonding yarn, in this example, is a yarn as previously described that melts upon reaching a predetermined temperature and fuses with the surrounding yarns and/or fibers.

The pre-stretched elasticized yarn, in this example, is a yarn that includes a core of elastic fiber material such as a polyether-polyurea copolymer or other suitable polymer. The pre-stretched elasticized yarn also includes releasable fibers of a low-melt polyurethane, a polyamide and/or a polyolefin. The pre-stretched elasticized yarn is manufactured with the elastic fiber material under tension with the releasable fibers maintaining the elastic fiber material in a tensioned condition. The pre-stretched elasticized yarn is then knitted into the fastener member 300 in the tensioned state.

When heat (or other suitable energy source) is applied to the pre-stretched elasticized yarn, the releasable fibers melt. As the releasable fibers melt, the tensioned fibers can release the tension stored in the pre-stretched fibers causing the pre-stretched elasticized yarn to return to a pre-tensioned state. When the releasable fibers melt, the tensioned fibers cause a knitted structure, such as the fastener member 300, to change shape.

Figure 32:
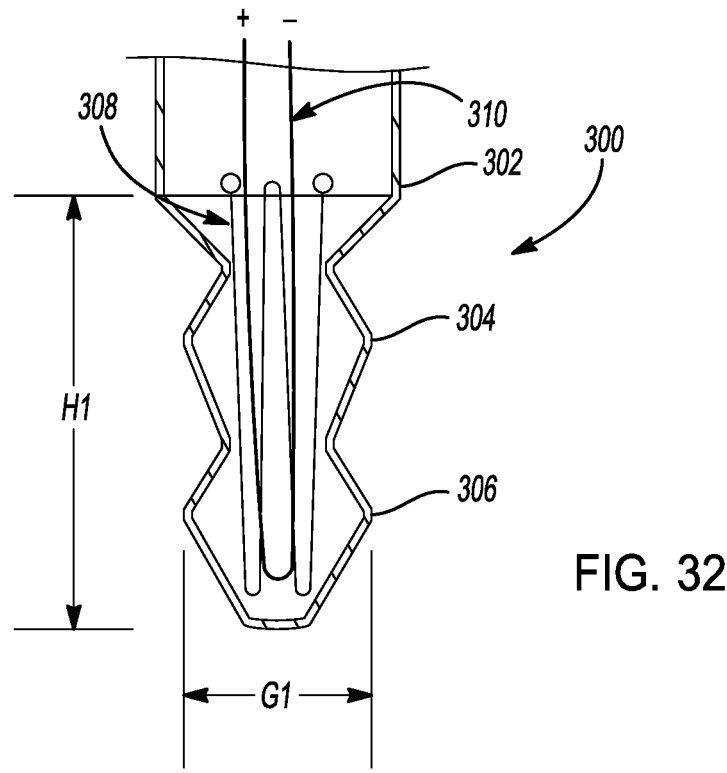
FIG. 32 is an illustration of another example fastener member shown in an initial state.

As described above, the fastener member 300, in the example shown in FIG. 32, also includes a heat-generating yarn. The heat-generating yarn is a yarn that includes metal, ceramic, carbon-based or other electrically conductive materials or composites thereof in combination with other fibers. When the heat-generating yarn is electrically coupled to a power source, the temperature of the heat-generating yarn increases.

The fastener member 300, in the example shown in FIGS. 32-36, has a structure similar to the fastener member 120 previously described. As shown, the fastener member 300 includes a stem portion 302, a first gripping portion 304 and a second gripping portion 306. The fastener member 300 is connected to the trim cover 30 and projects away from the trim cover 30. As can be appreciated, the trim cover 30 can include a plurality of the fastener members 300 to attach the trim cover 30 to the vehicle seat 20.

The fastener member 300 is integrally knitted in the trim cover 30. The stem portion 302, the first gripping portion 304 and the second gripping portion 306 are knitted with the bonding yarn. The fastener member 300 includes an elastic portion 308 that is included into the stem portion 302, the first gripping portion 304 and/or the second gripping portion 306. The elastic portion 208, in the example shown, is a length of the pre-stretched elasticized yarn that is looped longitudinally in the fastener member 300. The elastic portion 208 is positioned in the knitted structure of the fastener member 300 in the looped pattern by inlaying the pre-stretched elasticized yarn in the fastener member 300 during the knitting process.

The fastener member 300 also includes a heating portion 310. In the example shown, the heating portion is a loop positioned inside the stem portion 302, the first gripping portion 304 and/or the second gripping portion 306. The heating portion 310, in this example, is a length of heat-generating yarn that is positioned in the knitted structure of the fastener member 300 by inlaying the heat-generating yarn in the fastener member 300 during the knitting process. While not shown in FIG. 33-36, the fastener member 300 can include the heating portion 310 to heat the fastener member 300 to one or more predetermined temperatures to cause the fastener member 300 to change shape and secure to the mating panel 106.

Figure 36:
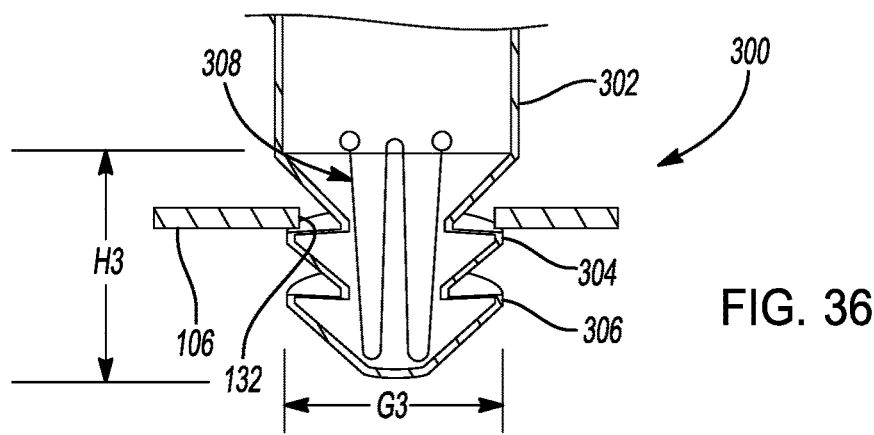
FIG. 36 is an illustration of the fastener member of FIG. 32 shown in a secured state in the mating panel.

The fastener member 300 operates in multiple states to assist in installing the fastener member 300 into the mating panel 106 and in securing the fastener member 300 to the mating panel 106. The fastener member 300 operates in an initial state (FIGS. 32 and 33), a released state (FIG. 34), a fusing state (FIG. 35) and in a secured state (FIG. 36). In the example shown, the fastener member 300 moves from one state to the next in the process of securing the fastener member 300 to the mating panel 106.

Figure 33:
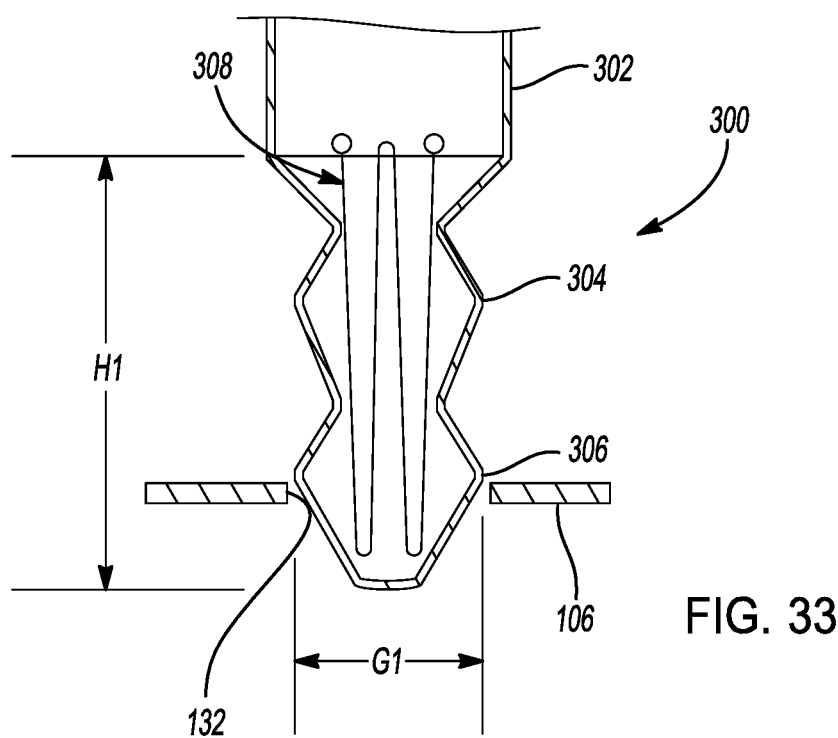
FIG. 33 is an illustration of the fastener member of FIG. 32 shown being installed into a mating panel.

As shown in FIGS. 32 and 33, the fastener member 300 is shown in the initial state. The fastener member 300 in this state is ready for installation into a hole 132 in the mating panel 106. In the initial state, the fastener member 300 has an initial length of H1 between the stem portion 302 and the distal end of the second gripping portion 306. The first gripping portion 304 and the second gripping portion 306 have an accordion shape. The first gripping portion 304 and the second gripping portion 306 have an outer width or diameter of G1.

With this sizing of the fastener member 300, the first gripping portion 304 and the second gripping portion 306 can pass through the hole 132 in the mating panel 106 because the outer width G1 of the first gripping portion 304 and the second gripping portion 306 is smaller than the internal diameter of the hole 132.

Once the fastener member 300 is inserted into the mating panel 106, the fastener member 300 is heated to a release temperature. The fastener member 300 can be heated to the release temperature by connecting the heating portion 310

(FIG. 32) to a suitable DC power source or by using any other suitable heat or energy source such as hot water, steam, heat gun, infrared source, oven, vibration or other energy sources previously described. The release temperature is a predetermined temperature at which the release fibers in the pre-stretched elasticized yarn of the elastic portion 308 melt. In one example, the release temperature is a temperature in the range of 60 to 110 degrees Celsius. In other examples, the release temperature can be other temperatures. In this example, the release temperature is less than the melting temperature of the bonding yarn that is knitting in the first gripping portion 304 and/or the second gripping portion 306.

Figure 34:
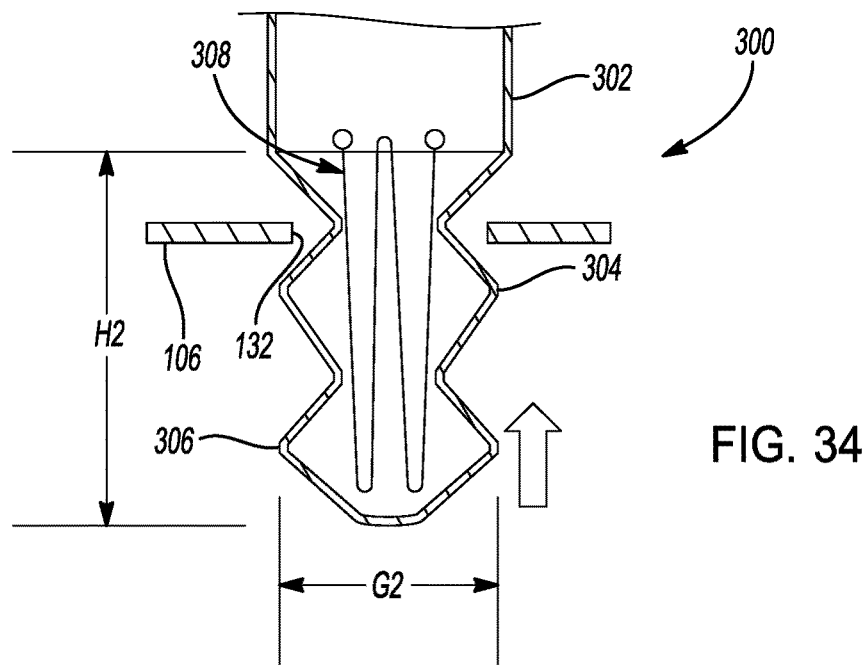
FIG. 34 is an illustration of the fastener member of FIG. 32 shown in a released state installed in the mating panel.
Figure 35:
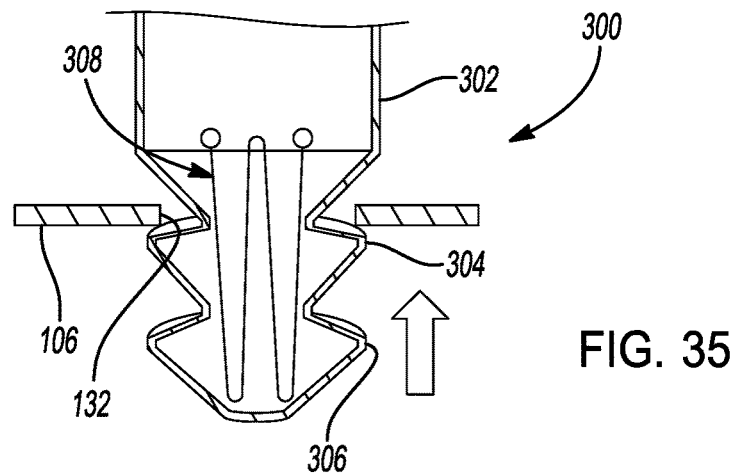
FIG. 35 is an illustration of the fastener member of FIG. 32 shown in a fusing state installed in the mating panel.

After the fastener member 300 is heated at or above the release temperature, the fastener member moves from the initial state to the released state. As shown in FIG. 34, the shape of the fastener member 300 changes in the released state. Since the release fibers in the pre-stretched elasticized yarn have melted in the released state, the pre-stretched elastic fibers in the pre-stretched elasticized yarn are permitted to release the tension and return to their relaxed lengths. As this occurs, the elastic portion 308 reduces in length causing the length of the fastener member 300 between the stem portion 302 and the distal end of the second gripping portion 306 to reduce from H1 to H2. In addition to reducing in length, the shape of the first gripping portion 304 and the second gripping portion widens causing the outer width of the first gripping portion 304 and the second gripping portion 306 to increase from G1 to G2.

As shown in FIG. 34, the width G2 of the first gripping portion 304 and the second gripping portion 306 in the released state is slightly larger than the inner diameter of the hole 132 in the mating panel 106. In the released state, the fastener member 300 is retained in the mating panel 106 by the interference between the first and second gripping portions 304, 306 and the mating panel 106. In the released state, however, the fastener member 300 is still flexible (since the bonding yarn of the fastener member has not yet hardened). In this flexible condition, the fastener members 300 can be adjusted to adjust the trim cover 30 over the vehicle seat 20, for example, before the fastener members 300 are hardened into a final secured position.

After the fastener member 300 is positioned in a desired orientation in the mating panel 106, the fastener member 300 is heated to a fusing temperature. Any of the previously described heating techniques can be used to heat the fastener member to the fusing temperature. The fusing temperature is the temperature that causes the bonding yarn in the fastener member 300 to melt. In one example, the fusing temperature is a temperature in the range of 110 to 160 degrees Celsius. In other examples, other fusing temperatures can be used. The fusing temperature, in this example, is greater than the release temperature.

After the fastener member 300 is heated to the fusing temperature, the low-melt portion of the bonding yarn of the fastener member 300 melts. As this occurs, the fastener member 300 further shortens as the elastic portion 308 further pulls the first gripping portion 304 and the second gripping portion 306 toward the stem portion 302. In the fusing state (FIG. 35), the fastener member 300 shortens and the side walls of the first gripping portion 304 and the second gripping portion 306 move toward horizontal positions.

The fastener member 300 is then permitted to cool and return from the fusing temperature to an ambient temperature. As this occurs, the low-melt fibers of the bonding yarn fuse with surrounding fibers to cause the fastener member 300 to harden. Once the bonding yarn has cooled and hardened, the fastener member 300 is in the secured state (FIG. 36). In the secured state, the fastener member 300 is a rigid member with a secured length H3. The secured length H3 is less than the released length H2 and less than the initial length H1. In the secured state, the first gripping portion 304 and the second gripping portion 306 have outer widths (or diameters) of G3. The outer width G3 is greater than the inner diameter of the hole 132 in the mating panel 106 to secure the fastener member 300 relative to the mating panel 106.

As can be appreciated, the fastener member 300 can be re-heated to the fusing temperature to cause the fastener member 300 to re-melt. When the low-melt material in the bonding yarn has melted, the fastener member 300 can be easily removed from the mating panel 106 for service, replacement or maintenance. The fastener member 300 can be re-installed into the mating panel 106 by re-heating the fastener members 300 and re-inserting the fastener members 300 into the mating panel 106.

Figure 37:
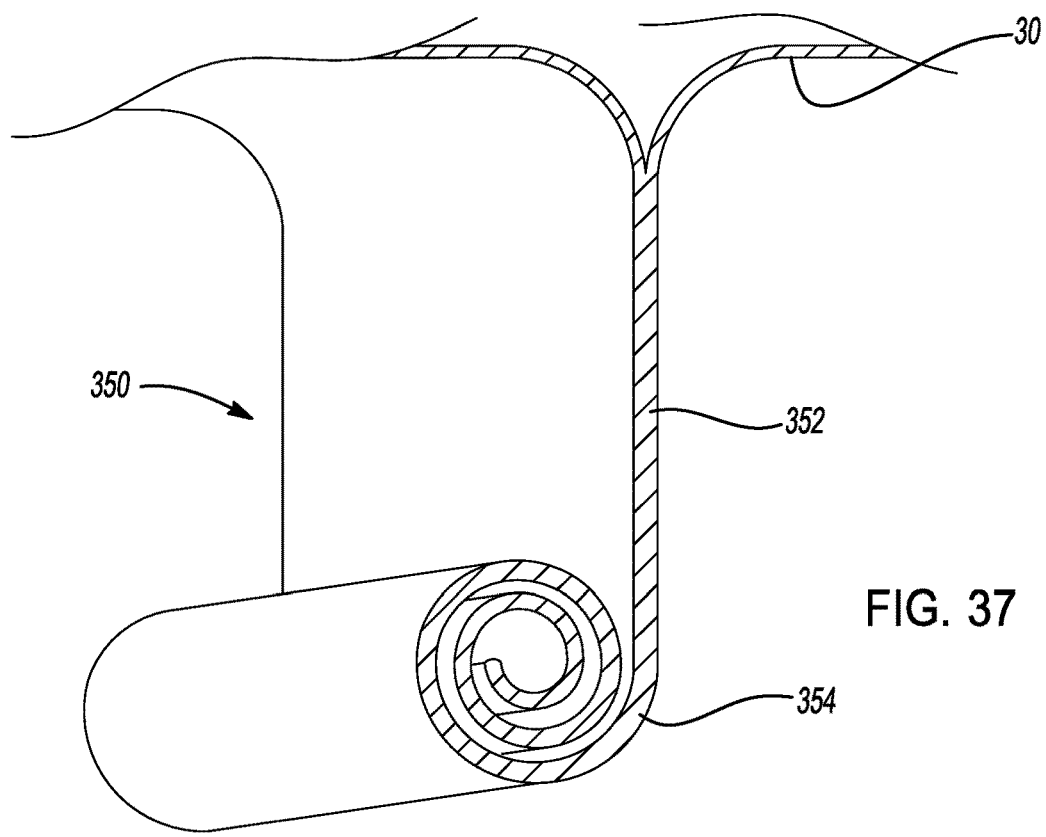
FIG. 37 is an illustration of another fastener member including a rolled portion.
Figure 38:
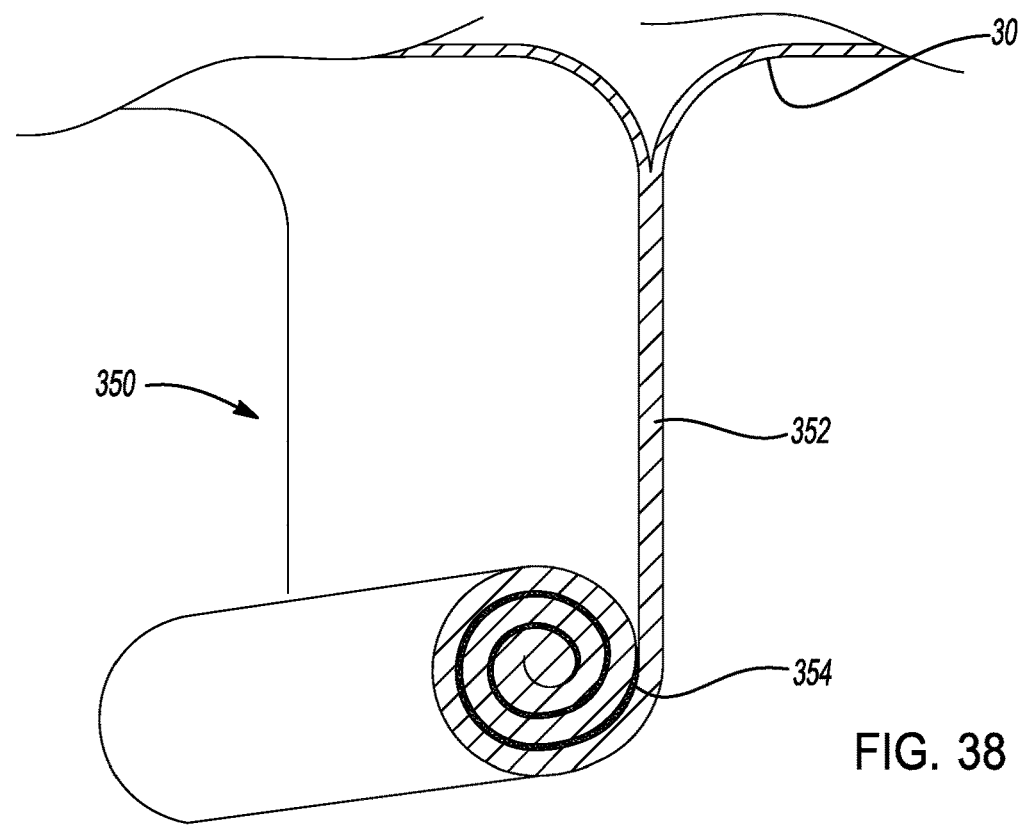
FIG. 38 is an illustration of the fastener member of FIG. 37 shown with the rolled portion fused in a rigid cylinder.

Another example fastener member 350, as shown in FIGS. 37 and 38, includes a tab 352 and a rolled portion 354. The fastener member 350 is connected to the trim cover 30 by the tab 352. The rolled portion 354 is positioned at an end of the tab 352 away from the trim cover 30. In this manner, the rolled portion 354 is connected to the vehicle seat 20 by a complimentary fastener member (not shown) such as a hog ring, a female fastener member or other crimping fastener.

In this example, the tab 352 and the rolled portion 354 are integrally knitted in the trim cover 30. At least part of the rolled portion 354 is knitted using the bonding yarn. The stitch or loop pattern of the knitted material in the rolled portion 354 is oriented to cause the rolled portion 354 to naturally roll back on itself without the need for coiling the rolled portion 354 using a secondary process.

After the trim cover 30 is knitted with the fastener member 350 and permitted to naturally curl, heat energy or other energy source is applied to the fastener member 350 to cause the bonding yarn in the rolled portion 354 to melt. The bonding yarn fuses with surrounding fibers or threads in the rolled portion 354 to fuse the rolled portion 354 in a rigid cylindrical member as shown in FIG. 38. In this fused condition, the rolled portion 354 is used to secure the trim cover 30 to the vehicle seat 20 using a hog ring, a complimentary female fastener member or other crimping fastener.

The previously described examples discuss the use of heat-activated yarns. The heat-activated yarns can be heated using hot water, steam, heat guns, ovens, electrical current or the like. In other examples, the heat-activated yarns can be activated using other energy sources such as ultraviolet light, infrared light, ultrasonic waves or other directed energy sources. The various types of conventional heat energy sources or the other energy sources can be used to cause yarn in the various fastening members to fuse together or to move from a relaxed state to an excited state.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A knitted seat trim cover for attachment to a vehicle seat, the knitted seat trim cover comprising:
   a knitted trim panel configured to be installed over at least one foam support member of the vehicle seat; and
   a fastener member integrally knitted in the knitted trim panel, the fastener member configured to connect the knitted trim panel to the vehicle seat, the fastener member including an extension portion that projects from the knitted trim panel and a male connector positioned at a distal end of the extension portion,
   wherein the extension portion of the fastener member is not made of a heat-activated yarn and the male connector is made of the heat-activated yarn.

2. The knitted seat trim cover of claim 1, wherein the heat-activated yarn is a bonding yarn configured to stiffen the fastener member after heat is applied to the fastener member.

3. The knitted seat trim cover of claim 2, wherein the male connector has a rounded shape and is configured to releasably connect inside a female connector of a complimentary fastener member located on the vehicle seat.

4. The knitted seat trim cover of claim 3, wherein a portion of the bonding yarn in the male connector melts when the heat is applied and hardens after the male connector cools.

5. The knitted seat trim cover of claim 2, wherein the fastener member includes a hook portion at a distal end thereof, the hook portion configured to releasably connect to a complimentary fastener member located on the vehicle seat.

6. The knitted seat trim cover of claim 5, wherein the hook portion is integrally knitted with the bonding yarn and is configured to harden in a J-shape after heat is applied to the fastener member.

* * * * *